United States Patent
Shiraishi

(10) Patent No.: US 8,982,405 B2
(45) Date of Patent: Mar. 17, 2015

(54) IMAGE PROCESSING DEVICE, IMAGE PROCESSING METHOD, AND IMAGE FORMING APPARATUS FOR PROCESSING IMAGE DATA HAVING A LARGER SIZE

(71) Applicant: Naoto Shiraishi, Kanagawa (JP)

(72) Inventor: Naoto Shiraishi, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 0 days.

(21) Appl. No.: 14/173,852

(22) Filed: Feb. 6, 2014

(65) Prior Publication Data

US 2014/0233067 A1    Aug. 21, 2014

(30) Foreign Application Priority Data

Feb. 19, 2013 (JP) ................. 2013-030439
Oct. 30, 2013 (JP) ................. 2013-226048

(51) Int. Cl.
*G06K 15/00* (2006.01)
*G06K 15/02* (2006.01)
*H04N 1/40* (2006.01)

(52) U.S. Cl.
CPC ..................... *G06K 15/02* (2013.01)
USPC .......................... 358/1.17; 358/1.16

(58) Field of Classification Search
USPC .............. 358/1.9, 3.06, 3.11, 3.2, 3.22, 3.14, 358/1.14, 1.15, 1.16, 1.17, 534–536
See application file for complete search history.

(56) References Cited

U.S. PATENT DOCUMENTS

| | | |
|---|---|---|
| 5,448,690 A | 9/1995 | Shiraishi et al. |
| 5,739,826 A | 4/1998 | Shiraishi et al. |
| 5,859,650 A | 1/1999 | Shiraishi |
| 6,081,274 A | 6/2000 | Shiraishi |
| 6,542,255 B1 * | 4/2003 | Nakamura ................ 358/1.17 |
| 6,963,412 B1 * | 11/2005 | Toda ........................ 358/1.13 |
| 8,320,020 B2 * | 11/2012 | Karito et al. ............ 358/3.06 |
| 8,373,708 B2 * | 2/2013 | Parikh et al. ............ 345/502 |
| 2003/0063813 A1 | 4/2003 | Shiraishi |
| 2004/0150656 A1 | 8/2004 | Shiraishi |
| 2005/0062994 A1 | 3/2005 | Shiraishi |
| 2005/0207667 A1 | 9/2005 | Shiraishi |
| 2005/0246684 A1 | 11/2005 | Shiraishi |
| 2009/0128857 A1 | 5/2009 | Shiraishi |
| 2010/0238467 A1 | 9/2010 | Shiraishi |
| 2011/0033125 A1 | 2/2011 | Shiraishi |

(Continued)

FOREIGN PATENT DOCUMENTS

| | | |
|---|---|---|
| JP | 06-059665 | 3/1994 |
| JP | 06-243262 | 9/1994 |

(Continued)

*Primary Examiner* — Gabriel Garcia
(74) *Attorney, Agent, or Firm* — Harness, Dickey & Pierce, P.L.C.

(57) ABSTRACT

An image processing device includes: a drawing command transfer unit that transfers a drawing command for generating image data in a third region of a second storage unit to a first region of a first storage unit; a drawing unit that generates band image data in units of a band having a lower height compared with one page and a predetermined width, in accordance with the drawing command in the first region; a band image data transfer unit that transfers the band image data to a second region of the first storage; and an image transfer unit that transfers the band image data in the second region to a fourth region of the second storage unit. The drawing unit determines the first region according to a size of the drawing command, and determines the second region by subtracting the first region from a region of the first storage unit.

10 Claims, 14 Drawing Sheets

(56) References Cited

U.S. PATENT DOCUMENTS

| | | |
|---|---|---|
| 2011/0063143 A1 | 3/2011 | Shiraishi |
| 2012/0133984 A1* | 5/2012 | Hayakawa .................. 358/1.16 |
| 2013/0094037 A1 | 4/2013 | Shiraishi |
| 2013/0155466 A1 | 6/2013 | Shiraishi |

FOREIGN PATENT DOCUMENTS

| | | |
|---|---|---|
| JP | 2005-309865 | 11/2005 |
| JP | 2008-023959 | 2/2008 |
| JP | 2009-269341 | 11/2009 |
| JP | 4833770 | 9/2011 |

* cited by examiner

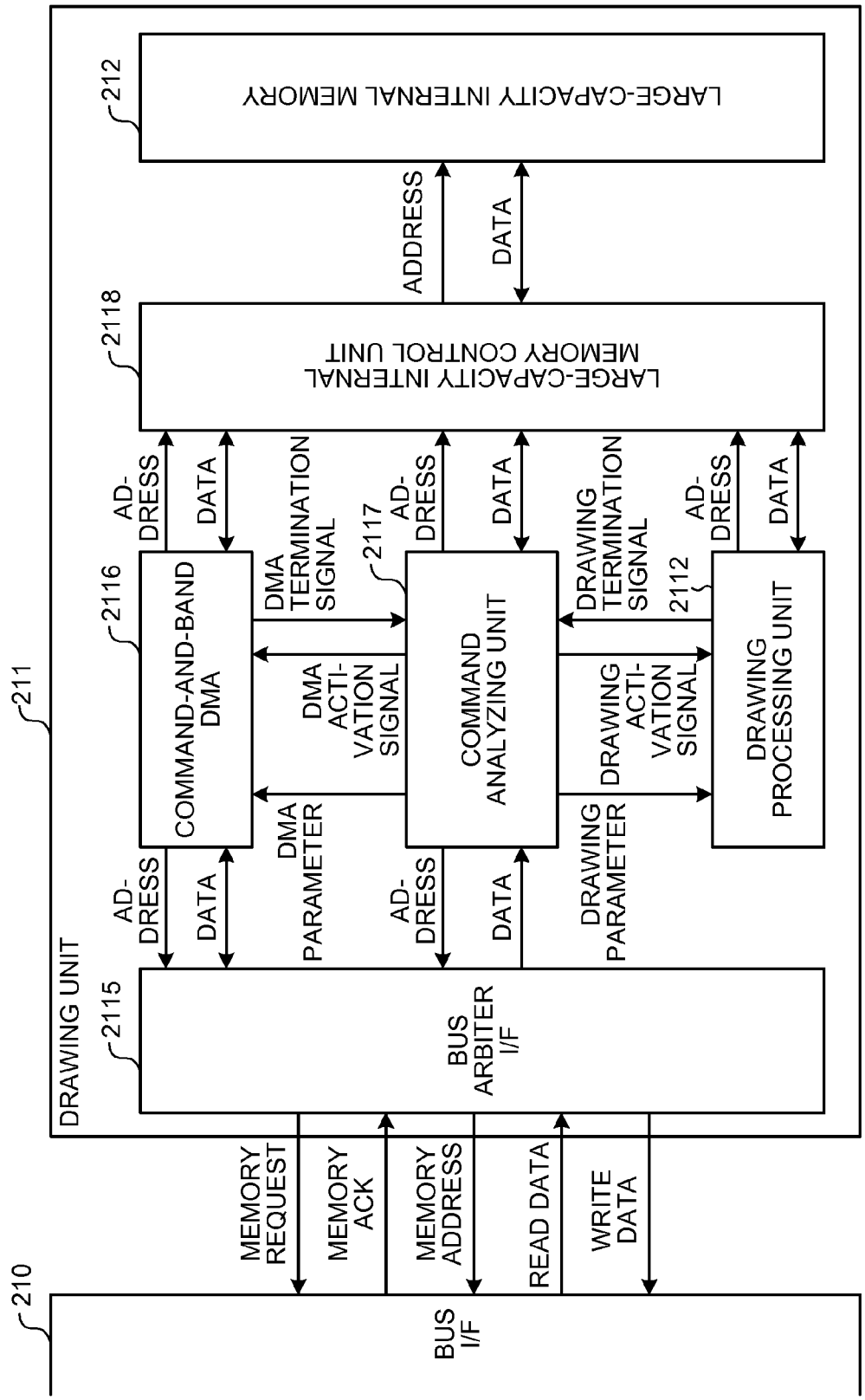

IMAGE PROCESSING DEVICE, IMAGE PROCESSING METHOD, AND IMAGE FORMING APPARATUS FOR PROCESSING IMAGE DATA HAVING A LARGER SIZE

CROSS-REFERENCE TO RELATED APPLICATIONS

The present application claims priority to and incorporates by reference the entire contents of Japanese Patent Application No. 2013-030439 filed in Japan on Feb. 19, 2013 and Japanese Patent Application No. 2013-226048 filed in Japan on Oct. 30, 2013.

BACKGROUND OF THE INVENTION

1. Field of the Invention

The present invention relates to an image processing device, an image processing method, and an image forming apparatus, in particular to those preferably used for processing image data having a larger size.

2. Description of the Related Art

Conventionally known are printer apparatuses (page printers) that perform printing for each page. Furthermore, also conventionally known are color printers that perform color printing by using respective colors of cyan (C), magenta (M), yellow (Y), and black (K), for example.

Flow of processing in the printers with the conventional techniques is described schematically. For example, page description language (PDL) data created on a personal computer or the like is transferred to the printer through a predetermined interface such as a network and a cable. In the printer apparatus, a printer controller analyzes the transferred PDL data and crates intermediate language that can be executed by a drawing unit. The drawing unit analyzes the created intermediate language to generate image data. Then, the drawing unit performs gradation processing on the generated image data to obtain binary image data. The binary image data is written into a memory as pieces of band image data formed by dividing the image data of one page in the sub-scanning direction.

It is to be noted that the memory into which the band image data is written is referred to as a band memory. Furthermore, an operation of writing the generated image data into the memory is referred to as drawing. The drawing of an image is performed for each of the colors of C, M, Y, and K.

The printer controller encodes pieces of image data of the respective colors drawn in the band memory with a binary image compression algorithm such as a joint bi-level image expert group (JBIG), and writes the generated respective codes into a main memory. At the time of printing, the printer reads out the codes from the main memory and decodes them while delaying timings for the respective planes of C, M, Y, and K for each of them. Then, the printer transfers the pieces of decoded data to printer engines corresponding to the respective planes of C, M, Y, and K so as to perform printing.

The printer apparatuses such as the page printers are required to increase a print resolution and increase a printing speed. It is, however, difficult to achieve these requirements only by processing capability of a central processing unit (CPU) controlling operations of the printer.

For example, in a high-speed apparatus having a high printing speed of 60 page per minute (PPM), it is necessary to draw a color image with respective colors of red (R), green (G), and blue (B) for one page having an A4 size ($\cong$8.27 inches×11.69 inches) at 600 dot per inch (dpi) or 1200 dpi for equal to or lower than 1 second. This requires the high-speed apparatus to make memory access at a higher speed when image processing is performed.

On the other hand, known is a technique of configuring an image processing unit including the above-mentioned drawing unit, an encoding unit that compresses and encodes image data drawn in a band memory, a decoding unit that decodes the codes read from the main memory so as to restore the image data, and an engine controller that controls a printer engine in one application specific integrated circuit (ASIC). By configuring the image processing unit, the encoding unit, the decoding unit and the engine controller in the one ASIC, the manufacturing cost can be reduced and the printer apparatus can be reduced in size.

The main memory configuring the band memory is incorporated in the ASIC. This enables the image processing unit to access the main memory without using a bus, thereby performing the image processing at a higher speed. For example, when the image processing is performed on the A4 size at the resolution of 600 dpi, the total number of pixels is 6800 pixels×4720 pixels. In this case, when one pixel has a data size of 32 bits, a memory capacity of approximately 128 MB is needed. It is difficult to incorporate the memory having such a large capacity in the ASIC generally. For this reason, the image processing unit accesses the main memory from the ASIC through the bus so as to perform the image processing, leading to lowering of the processing speed.

With the recent development of a semiconductor process, an operation speed of a dynamic random access memory (DRAM) that is used for the main memory is increased. With this, a transfer rate between a memory controller controlling access to the main memory and a central processing unit (CPU) is also increased. Furthermore, general-purpose CPUs incorporating the memory controller have been developed.

When the general-purpose CPU incorporating the memory controller is used as the CPU of the printer controller, it is considered that the ASIC including the image processing unit is connected to a standard bus of the general-purpose CPU. That is to say, the DRAM that is used as the main memory is connected to the standard bus and the image processing unit accesses the DRAM through the standard bus in accordance with control by the memory controller incorporated in the general-purpose CPU.

Japanese Patent Application Laid-open No. 2008-023959 discloses a technique capable of improving a printing speed by using a CPU having a relatively low processing speed by drawing multivalued RGB information of a printer in a band memory with an operation by software on the CPU and executing image processing with hardware. Japanese Patent No. 4833770 discloses a technique of providing a local memory in addition to a main memory, performing drawing processing with hardware, encoding drawing data, and transferring it through a bus. In addition, Japanese Patent Application Laid-open No. 2005-309865 discloses a technique of enhancing drawing performance by executing respective pieces of processing relating to drawing in parallel and performing pipe line processing having large parallelism in a drawing processing unit so as to improve a printing speed by using a CPU having a relatively low processing speed.

The method of accessing the main memory through the standard bus by using the general-purpose CPU incorporating the memory controller as the CPU of the printer controller has preferable efficiency when data is transferred in serial.

On the other hand, in the drawing processing, there is a possibility that random access occurs frequently in various pieces of processing included in the drawing processing. In this case, the memory is not accessed efficiently and it takes a lot of time to access the memory. This lowers the transfer rate of the bus and arises a risk that access to the main memory from another piece of hardware is inhibited. In particular, when the drawing processing is executed only by software processing on the CPU, many pieces of memory access are performed. It is necessary to use a CPU having a high processing speed, resulting in a problem that the apparatus is increased in cost.

A method of providing a memory dedicated for drawing on the ASIC is also considered. In this case, the dedicated memory is provided separately from the main memory, resulting in a problem that the apparatus is increased in cost.

In view of the above-mentioned circumstances, there is a need to enable generation of image data having a large size at a higher speed by a configuration with reduced cost.

SUMMARY OF THE INVENTION

It is an object of the present invention to at least partially solve the problems in the conventional technology.

An image processing device includes: a first storage unit including a first region and a second region; a second storage unit including a third region storing therein a drawing command for generating image data for at least one page, and a fourth region capable of storing therein image data for each page; a drawing command transfer unit configured to transfer the drawing command stored in the third region to the first region to store the drawing command in the first region; a drawing unit configured to generate band image data in units of a band having a height lower than a height of one page and a width determined previously, in accordance with the drawing command stored in the first region; a band image data transfer unit configured to transfer the band image data for one band that has been generated by the drawing unit to the second region to store the band image data in the second region; and an image transfer unit configured to transfer the band image data stored in the second region to the fourth region to store the band image data in the fourth region. The drawing unit determines the first region in accordance with a size of the drawing command stored in the third region, and determines a region obtained by subtracting the first region from a region of the first storage unit to be the second region.

An image processing method includes: transferring, to a first region included in a first storage unit, a drawing command for generating image data for at least one page stored in a third region that is included in a second storage unit to store the drawing command in the first region; analyzing the drawing command stored in the first region so as to acquire a command included in the drawing command, determining the first region in accordance with a size of the drawing command stored in the third region, and determining a region obtained by subtracting the first region from a region of the first storage unit to be a second region; generating band image data in units of a band having a height lower than a height of one page and a width determined previously, in accordance with the drawing command stored in the first region; transferring the band image data for one band that has been generated at the generating to the second region and storing the band image data in the second region; and transferring the band image data stored in the second region to a fourth region that is included in the second storage unit and is capable of storing therein image data for each page, to cause the image data in the fourth region.

An image forming apparatus includes: an image processing device; and an image forming unit. The image processing device includes: a first storage unit including a first region and a second region; a second storage unit including a third region storing therein a drawing command for generating image data for at least one page, and a fourth region capable of storing therein image data for each page; a drawing command transfer unit configured to transfer the drawing command stored in the third region to the first region to store the drawing command in the first region; a drawing unit configured to generate band image data in units of a band having a height lower than a height of one page and a width determined previously, in accordance with the drawing command stored in the first region; a band image data transfer unit configured to transfer the band image data for one band that has been generated by the drawing unit to the second region to store the band image data in the second region; and an image transfer unit configured to transfer the band image data stored in the second region to the fourth region to store the band image data in the fourth region. The drawing unit determines the first region in accordance with a size of the drawing command stored in the third region, and determines a region obtained by subtracting the first region from a region of the first storage unit to be the second region. The image forming unit forms an image on a recording medium in accordance with the image data stored in the fourth region.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a block diagram illustrating an example of the configuration of a drawing unit in the first embodiment;

DETAILED DESCRIPTION OF THE PREFERRED EMBODIMENTS

Hereinafter, embodiments of an image processing device, an image processing method, and an image forming apparatus are described in detail with reference to the accompanying drawings.

First Embodiment

Figure 1:
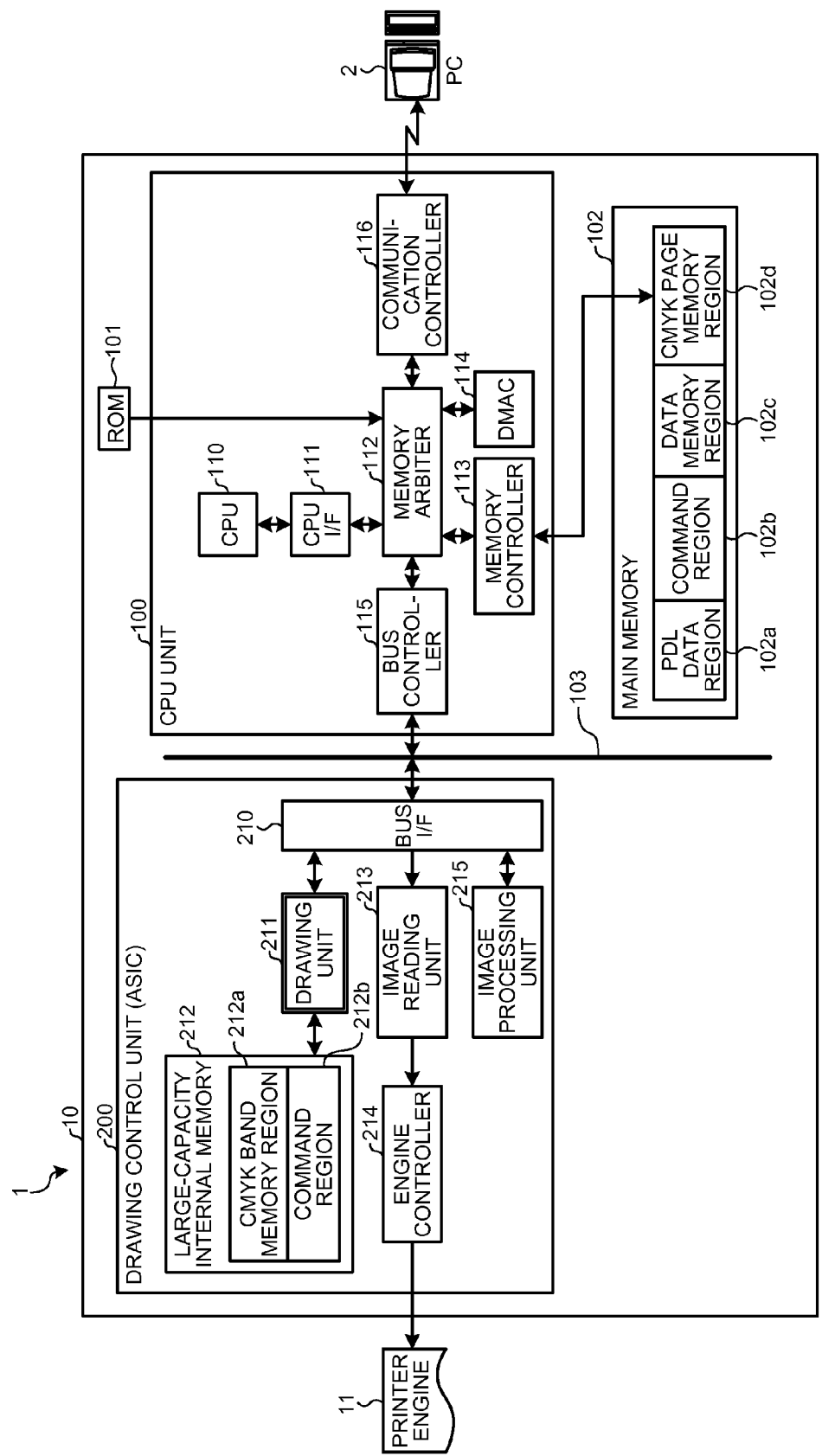
FIG. 1 is a block diagram illustrating an example of the configuration of an image forming apparatus according to a first embodiment.

FIG. 1 is a block diagram illustrating an example of the configuration of an image forming apparatus according to a first embodiment. In FIG. 1, this image forming apparatus 1 includes an image formation control unit 10 and a printer engine 11. The image formation control unit 10 includes a central processing unit (CPU) unit 100 and a drawing control unit 200. The CPU unit 100 incorporates a memory controller 113. The drawing control unit 200 incorporates an engine controller 214 controlling the printer engine 11. The image formation control unit 10 is a controller board that is formed on one substrate, for example. The drawing control unit 200 is formed in one application specific integrated circuit (ASIC). The CPU unit 100 and the drawing control unit 200 are connected to each other through a bus 103.

The CPU unit 100 includes a CPU 110, a CPU interface (I/F) 111, a memory arbiter 112, the memory controller 113, a direct memory access controller (DMAC) 114, a bus controller 115, and a communication controller 116. The respective parts included in the CPU unit 100 are configured integrally in one integrated circuit, for example. A read only memory (ROM) 101 and a main memory 102 are connected to the CPU unit 100. The ROM 101 previously stores therein various types of programs for controlling the image forming apparatus 1. The CPU 110 controls operations of the image forming apparatus 1 overall in accordance with the programs stored in the ROM 101.

In the CPU unit 100, the CPU 110 is connected to the memory arbiter 112 through the CPU I/F 111. The main memory 102 is connected to the memory arbiter 112 through the memory controller 113. Each of the ROM 101, the DMAC 114, and the communication controller 116 is connected to the memory arbiter 112. The memory arbiter 112 is further connected to the bus 103 through the bus controller 115. The memory arbiter 112 arbitrates communication between the main memory 102 and the respective parts connected to the memory arbiter 112.

The CPU I/F 111 is an interface between the CPU 110 and the memory arbiter 112. The CPU 110 controls the respective parts of the image forming apparatus 1 through the CPU I/F 111 and the memory arbiter 112. The memory controller 113 controls access to the main memory 102 in accordance with an instruction from the CPU 110. The bus controller 115 controls access to the bus 103. The DMAC 114 controls direct access to the main memory 102 through the memory controller 113 and controls direct access to the drawing control unit 200 through the bus 103 in accordance with an instruction from the CPU 110.

The main memory 102 is a second storage unit and includes a plurality of predetermined regions. In the example of FIG. 1, the main memory 102 includes a PDL data region 102a, a command region 102b that is a third region, a data memory region 102c, and a CMYK page memory region 102d that is a fourth region.

The communication controller 116 controls communication with external apparatuses. In this example, the communication controller 116 controls communication with an external information processing device such as a personal computer (PC) 2. The PC 2 generates data with a page description language (PDL) in accordance with a print operation by a user, for example. The generated PDL data is transmitted from the PC 2 to the communication controller 116 and is stored in the PDL data region 102a of the main memory 102 through the memory arbiter 112.

The drawing control unit 200 includes a bus I/F 210, a drawing unit 211, a large-capacity internal memory 212, an image reading unit 213, the engine controller 214, and an image processing unit 215. The large-capacity internal memory 212 includes a CMYK band memory region 212a that a first region and a command region 212b that is a second region.

The bus I/F 210 is an interface with the bus 103. The drawing unit 211 reads a drawing command generated by the CPU 110 based on the PDL data through the bus 103 to store it in the command region 212b of the large-capacity internal memory 212. The drawing unit 211 generates image data in accordance with the read drawing command and writes it into the CMYK band memory region 212a of the large-capacity internal memory 212 so as to perform drawing processing.

When a predetermined amount of image data is written into the CMYK band memory region 212a, the drawing unit 211 reads out the predetermined amount of image data from the CMYK band memory region 212a and transfers it to the CPU unit 100 through the bus 103. The predetermined amount of image data transferred to the CPU unit 100 is stored in the CMYK page memory region 102d of the main memory 102.

The image processing unit 215 reads the image data stored in the CMYK page memory region of the main memory 102 so as to perform image processing thereon. Then, the image processing unit 215 transfers the image data on which the image processing has been performed to the main memory 102.

The image reading unit 213 reads the image data for each page, for example, from the CMYK page memory region 102d of the main memory 102, and transfers it to the engine controller 214. The engine controller 214 supplies the transferred image data to the printer engine 11, and controls the printer engine 11 based on the image data. The printer engine 11 forms an image based on the image data on a recording medium such as print paper in accordance with the control by the engine controller 214 so as to perform printing.

The image forming apparatus 1 according to the embodiment can form an image as a color image with respective colors of cyan (C), magenta (M), yellow (Y), and black (K). That is to say, the PDL data generated on the PC 2 can include full-color information using the respective colors of CMYK. The CPU 110 generates a drawing command for generating image data with the respective colors of CMYK for each page based on the PDL data and stores it in the command region 102b of the main memory 102.

Drawing regions (generation regions of image data) for the respective colors of CMYK that form an image of one page are referred to as planes. To be specific, the planes correspond to regions of the respective colors of CMYK on the CMYK page memory region 102d of the main memory 102. The drawing unit 211 generates the image data of one page by dividing it into a plurality of pieces of image data having heights (the number of lines) lower than the height of one page in accordance with the drawing command. Each image data having the height lower than the height of one page is referred to band image data. That is to say, the drawing unit 211 generates the image data in units of the band image data.

Hereinafter, an operation of generating the image data in accordance with the drawing command is referred to as "drawing", and generation of the band image data is referred to as band drawing or drawing of a band image, unless otherwise specifically described.

The drawing unit 211 reads drawing commands for performing drawing for one page among the drawing commands stored in the command region 102b of the main memory 102. Then, the drawing unit 211 draws the pieces of image data with the respective colors of CMYK for each plane in accordance with the read drawing commands and writes them into the CMYK band memory region 212a of the large-capacity internal memory 212.

That is to say, for example, the drawing unit 211 performs the band drawing of a plane of the color C in accordance with the drawing command and writes it into the CMYK band memory region 212a. When the drawing unit 211 has written band image data of the plane of the color C into the CMYK, band memory region 212a, the band image data are read out from the CMYK band memory region 212a and are transferred to the CMYK page memory region 102d of the main memory 102. After the drawing unit 211 performs the drawing of the plane of the color C for one page, it executes drawing of a subsequent plane, for example, a plane of the color M in a similar manner.

In this manner, band image data for one plane only are stored in the CMYK band memory region 212a of the large-capacity internal memory 212. This can reduce the capacity of the large-capacity internal memory 212, thereby reducing the cost of the ASIC constituting the drawing control unit 200.

As will be described in detail later, in the large-capacity internal memory 212, the CMYK band memory region 212a and the command region 212b are determined in accordance with a data size of the drawing commands stored in the command region 212b. In this case, when the data size of the drawing commands is relatively large and the size of the CMYK band memory region 212a is made smaller accordingly, the number of times that the drawing unit 211 reads out the drawing command from the command region 212b is increased. This arises a risk that the processing speed is lowered. For coping with this, only the image data for one plane is stored in the CMYK band memory region 212a, thereby making it possible to suppress lowering of the processing speed.

As will be described in detail later, the drawing unit 211 reads the drawing command from the command region 212b of the large-capacity internal memory 212 every time it performs the band drawing. With this, the drawing commands for one page are stored in the command region 212b so as to reduce access to the command region 102b of the main memory 102, thereby making it possible to perform drawing at a higher speed.

Figure 2:
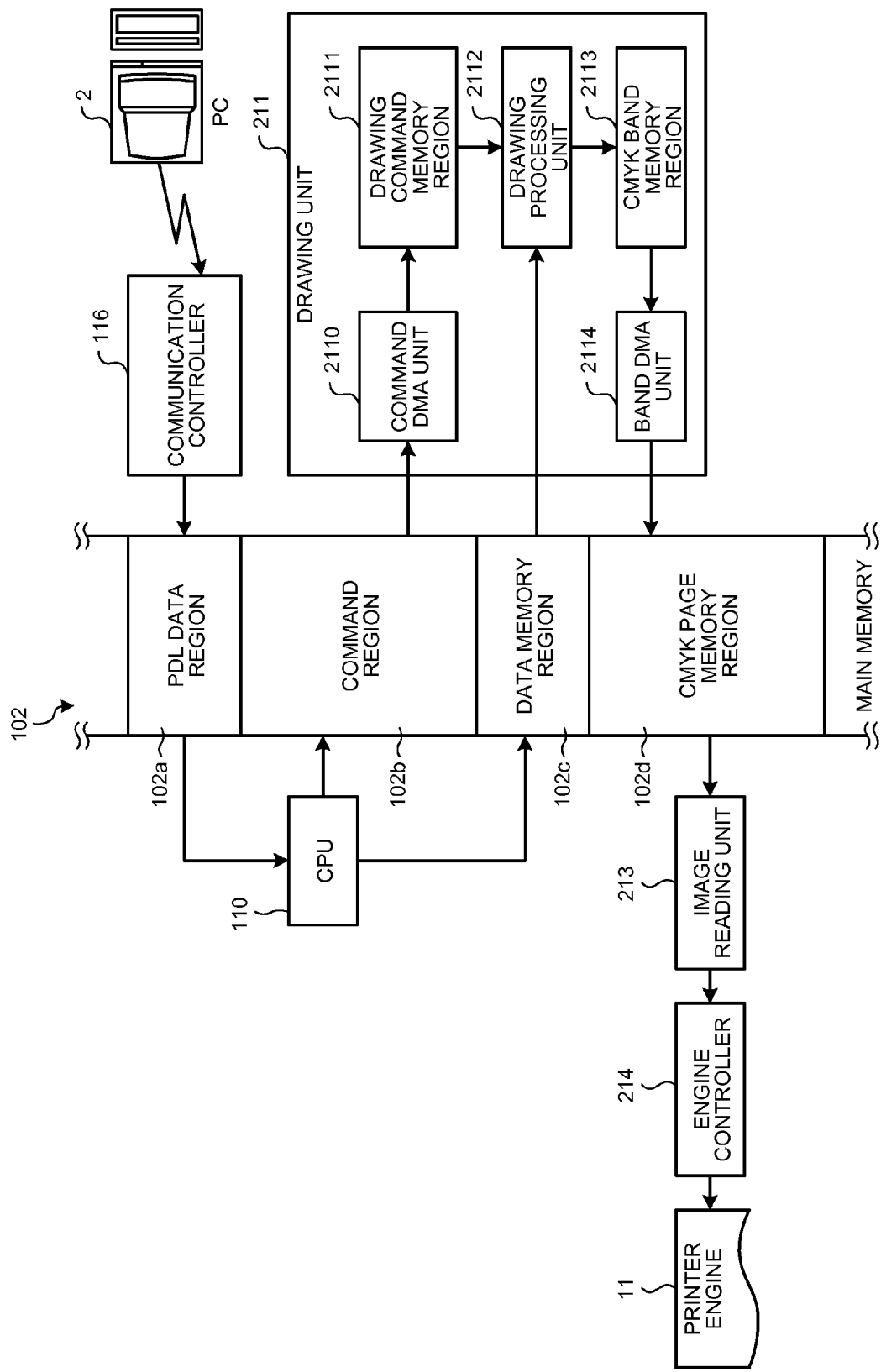
FIG. 2 is a diagram for explaining an example of operations of the image forming apparatus in the first embodiment.

An example of operations of the image forming apparatus 1 in the first embodiment is described with reference to FIG. 2. In FIG. 2, the same reference numerals denote the parts common to those in FIG. 1 above and detailed description thereof is omitted.

For example, the PC 2 generates the PDL data for forming an image and transmits it to the image forming apparatus 1. The PDL data is received by the communication controller 116 of the image forming apparatus 1 and is stored in the PDL data region 102a of the main memory 102.

The CPU 110 generates drawing commands for performing drawing for forming the image and picture image data as drawing data that is used for the drawing in units of a page based on the PDL data stored in the PDL data region 102a. The CPU 110 stores the generated drawing commands for one page, for example, in the command region 102b of the main memory 102. Furthermore, the CPU 110 stores the generated picture image data for one page, for example, in the data memory region 102c of the main memory 102, for example.

The drawing unit 211 includes a command direct memory access (DMA) unit 2110, a drawing page command memory region 2111, a drawing processing unit 2112, a CMYK band memory region 2113, and a band DMA unit 2114. Among them, the drawing page command memory region 2111 and the CMYK band memory region 2113 correspond to the command region 212b and the CMYK band memory region 212a in the large-capacity internal memory 212, respectively.

When the command DMA unit 2110 starts drawing processing for one page, it reads out the drawing commands for one page from the command region 102b of the main memory 102, and transfers them to the drawing page command memory region 2111 to store them in the drawing page command memory region 2111. The command DMA unit 2110 executes the reading processing of the drawing commands from the command region 102b only once for the drawing commands for one page.

The drawing processing unit 2112 checks a data size of the drawing commands for one page stored in the drawing command memory region 2111. Then, the drawing processing unit 2112 determines a region in the large-capacity internal memory 212 obtained by subtracting the checked data size of the drawing commands from the size of the large-capacity internal memory 212 to be the CMYK band memory region 2113 into which the band image data is written.

Figure 3:
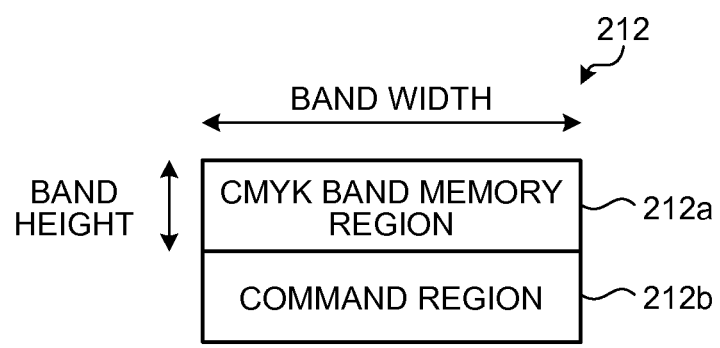
FIG. 3 is a diagram illustrating an example of the configuration of a large-capacity internal memory in the first embodiment.

FIG. 3 illustrates an example of the configuration of the large-capacity internal memory 212 in the first embodiment. The large-capacity internal memory 212 stores therein data in the height direction in units of a predetermined band width corresponding to one line. A storage region of the large-capacity internal memory 212 has a total height corresponding to a storage capacity of the large-capacity internal memory 212 overall for the predetermined band width.

The drawing processing unit 2112 determines the height of the command region 212b to the height corresponding to the data size of the drawing commands for one page. Furthermore, the drawing processing unit 2112 determines the height of the CMYK band memory region 212a to the height obtained by subtracting the height of the command region 212b from the total height of the large-capacity internal memory 212. The height of the CMYK band memory region 212a corresponds to a height of the band image data.

The drawing processing unit 2112 analyzes a drawing command read from the drawing page command memory region 2111. When a command obtained by analyzing the read drawing command is a drawing command for instructing drawing, the drawing processing unit 2112 transfers band image data generated in accordance with the drawing command to the CMYK band memory region 2113 to store it in the CMYK band memory region 2113 so as to perform band drawing. Furthermore, the drawing processing unit 2112 performs the band drawing for one plane of the planes of the respective colors of CMYK and stores the obtained band data in the CMYK band memory region 2113.

Figure 4:
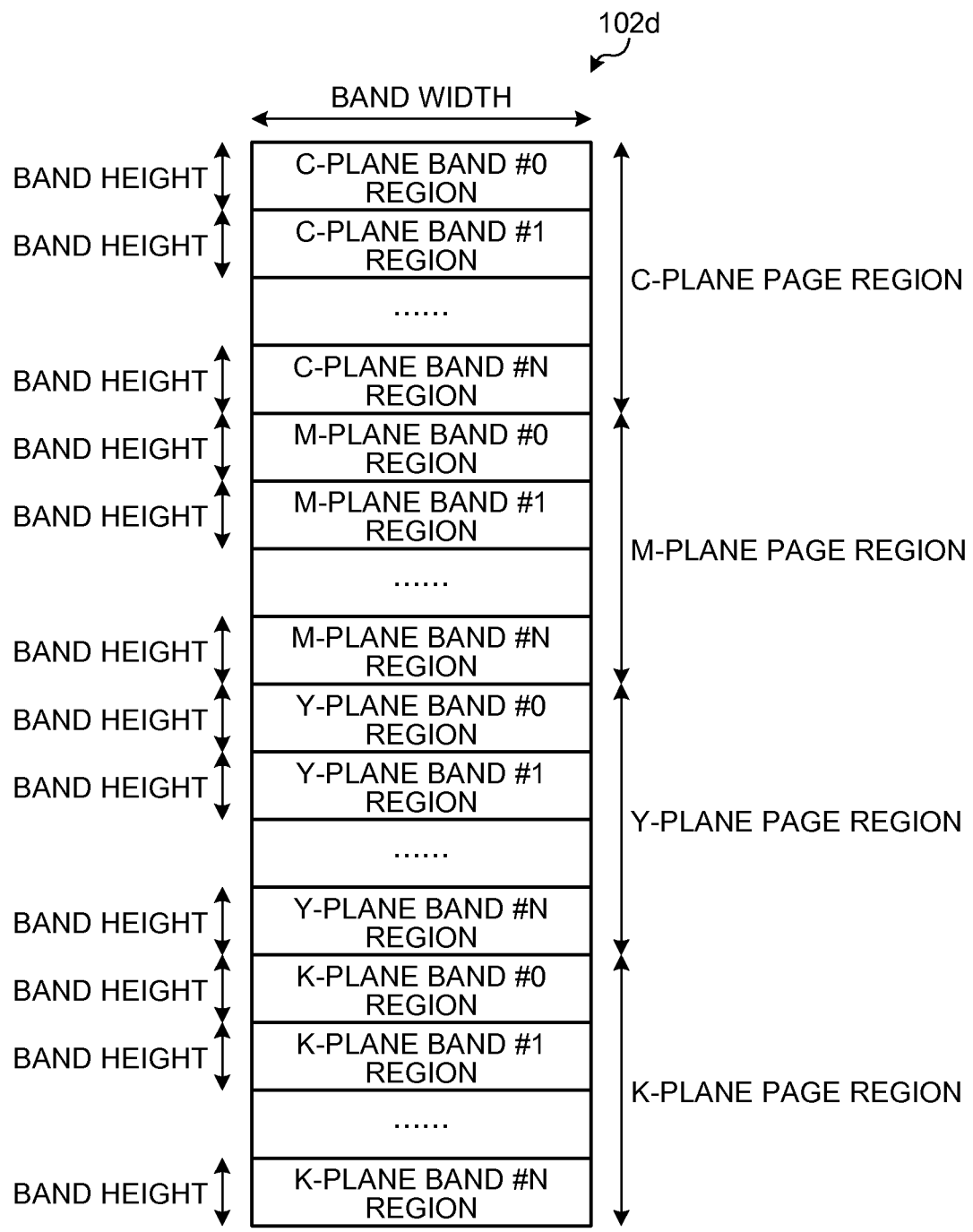
FIG. 4 is a diagram for explaining band drawing processing in a drawing processing unit in the first embodiment.

The band drawing processing in the drawing processing unit 2112 in the first embodiment is described with reference to FIG. 4. FIG. 4 illustrates an example of the configuration of the CMYK page memory region 102d of the main memory 102. The CMYK page memory region 102d has a predetermined band width and is provided with a C-plane page region, a Y-plane page region, an M-plane page region, and a K-plane page region in which planes (described as "planes" in FIG. 4) of the respective colors of CMYK for one page are stored, respectively.

Furthermore, the CMYK page memory region 102d is provided with band regions in each of the page regions for the respective color planes of CMYK. Each of the band regions has a band height equal to a band height determined for the CMYK band memory region 212a in the large-capacity internal memory 212. As the C-plane page region is described as an example, a C band #0 region, a C band #1 region, ..., and a C band #N region each having the band height are provided such that the total height thereof corresponds to the height of one page.

The drawing processing unit 2112 generates the band region in which the band image data is stored sequentially for each band drawing. To be specific, the drawing processing unit 2112 generates the band region so as to correspond to each of the band regions of the CMYK page memory region 102d that are illustrated as the C-plane band #0 region, the C-plane band #1 region, ..., and the C-plane band #N region in FIG. 4, for example. Then, the drawing processing unit 2112 performs the band drawing for one plane while performing clipping processing on the band region on which the drawing has been performed and writes the obtained data into the CMYK band memory region 2113.

When the writing of the band image data for one band region into the CMYK band memory region 2113 is completed, the band DMA unit 2114 transfers the band image data written into the CMYK band memory region 2113 to the CMYK page memory region 102d of the main memory 102. Then, the band DMA unit 2114 stores the transferred band image data in the band region corresponding to the band image data as illustrated in FIG. 4.

Every time the writing of the band image data into the CMYK band memory region 2113 is completed, the band DMA unit 2114 transfers the band image data written into the CMYK band memory region 2113 to the CMYK page memory region 102d of the main memory 102 to store the band image data in the corresponding band region. The band DMA unit 2114 repeats the transfer of the band image data to the CMYK page memory region 102d from the CMYK band memory region 2113 until the drawing processing unit 2112 finishes the band drawing for one plane. Furthermore, the band DMA unit 2114 repeats the transfer processing until the drawing processing unit 2112 finishes the band drawing for all the planes.

When the drawing processing unit 2112 completely performs the band drawing for all the planes of the respective colors of CMYK for one page, the drawing processing unit 2112 notifies the CPU 110 of the completion of the band drawing.

For example, when the CPU 110 receives the notification indicating the completion of the band drawing for all the planes of the respective colors of CMYK for one page, the CPU 110 instructs the image reading unit 213 to read the image data with the planes of the respective colors of CMYK for one page that is stored in the CMYK page memory region 102d.

The image reading unit 213 reads the image data with the planes of the respective colors of CMYK for one page from the CMYK page memory region 102d in accordance with the instruction and transfers it to the engine controller 214. The engine controller 214 outputs the transferred image data with the planes of the respective colors of CMYK for one page to the printer engine 11. The printer engine 11 forms an image on a recording medium such as print paper based on the image data with the planes of the respective colors of CMYK for one page that has been output from the engine controller 214.

FIG. 5 illustrates an example of the configuration of the drawing unit 211 in the first embodiment. In FIG. 5, the same reference numerals denote the parts common to those in FIG. 1 and FIG. 2 above and detailed description thereof is omitted. In the illustration of FIG. 5, the large-capacity internal memory 212 is incorporated in the drawing unit 211. This indicates that the large-capacity internal memory 212 is not limited to be configured to be connected to the drawing unit 211 and may be configured to be incorporated in the drawing unit 211.

In FIG. 5, the drawing unit 211 includes the drawing processing unit 2112, a bus arbiter I/F 2115, a command-and-band DMA 2116, a command analyzing unit 2117, a large-capacity internal memory control unit 2118, and the large-capacity internal memory 212.

The bus arbiter I/F 2115 is an interface with the bus I/F 210 in FIG. 1. The drawing unit 211 transmits a memory request and a memory address for requesting data reading, for example, to the memory arbiter 112 through the bus I/F 210, the bus 103, and the bus controller 115 while using the bus arbiter I/F 2115 as the interface. This enables the drawing unit 211 to access the main memory 102 and read the drawing commands and various pieces of data from the main memory 102. Memory acknowledgement is response to the memory request from the memory arbiter 112.

Furthermore, the bus arbiter I/F 2115 transmits the memory request and the memory address for requesting data writing to the memory arbiter 112. This enables the drawing unit 211 to write various pieces of data such as the band image data into the main memory 102.

The large-capacity internal memory control unit 2118 controls access to the large-capacity internal memory 212 in accordance with requests from the command-and-band DMA 2116, the command analyzing unit 2117, and the drawing processing unit 2112. The command-and-band DMA 2116 corresponds to the command DMA unit 2110 and the band DMA unit 2114 in FIG. 2, and controls transfer of the drawing commands to the command region 212b of the large-capacity internal memory 212 and transfer of the band image data from the CMYK band memory region 212a.

The command analyzing unit 2117 reads one drawing command from the command region 212b of the large-capacity internal memory 212 through the large-capacity internal memory control unit 2118 and analyzes it so as to acquire drawing parameters necessary for drawing. The command analyzing unit 2117 transmits the acquired drawing parameters to the drawing processing unit 2112 and outputs a drawing activation signal to the drawing processing unit 2112 so as to activate the drawing processing unit 2112.

When the command analyzing unit 2117 receives a drawing completion signal from the drawing processing unit 2112, the command analyzing unit 2117 reads subsequent one drawing command from the command region 212b and analyzes it. Then, the command analyzing unit 2117 supplies the drawing parameters and the drawing activation signal to the drawing processing unit 2112.

The drawing processing unit 2112 is activated with the drawing activation signal output from the command analyzing unit 2117 and performs band drawing of a predetermined band region in a page for one plane among the planes of the respective colors of CMYK in accordance with the drawing parameters transmitted from the command analyzing unit 2117. The drawing processing unit 2112 writes the drawn band image data into the CMYK band memory region 212a of the large-capacity internal memory 212 through the large-capacity internal memory control unit 2118. When the drawing processing unit 2112 finishes writing of the one band image data, the drawing processing unit 2112 outputs the drawing completion signal to the command analyzing unit 2117.

FIGS. 6A to 6D illustrate examples of the drawing command in the first embodiment. In the examples, the drawing command includes a drawing hardware parameter setting command, a graphics drawing command, and a picture image drawing command.

Figure 6A:
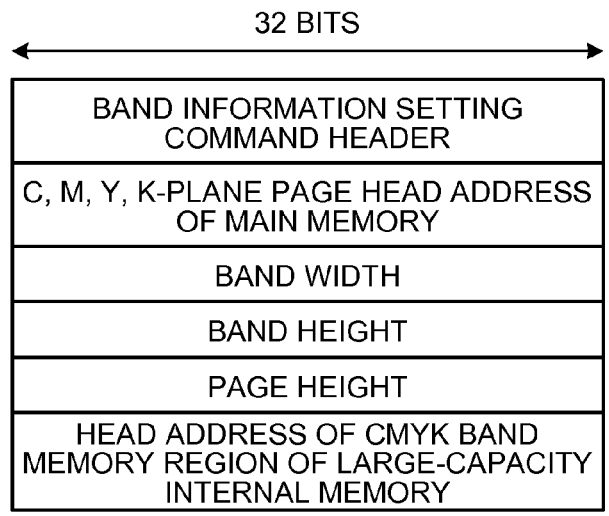
FIGS. 6A to 6D are diagrams illustrating examples of a drawing command in the first embodiment.
Figure 6B:

FIG. 6A and FIG. 6B illustrate examples of the drawing hardware parameter setting command. The drawing hardware parameter setting command is a command for setting the parameters of the drawing processing. FIG. 6A illustrates an example of a band initializing command of the drawing hardware parameter setting command. The band initializing command is a command to initialize a band to "white", for example, and includes parameters defining head addresses of the page regions (see FIG. 4) of the planes of the respective colors of CMYK in the main memory 102, the band width, the band height, the page height, and a head address (see FIG. 3) of the CMYK band memory region 212a in the large-capacity internal memory 212 with pieces of data subsequent to a band information setting command header.

As described above, in the large-capacity internal memory 212, the CMYK band memory region 212a is determined based on the size of the drawing commands for one page. That is, the band height is a variable value. Furthermore, as the head address of the CMYK band memory region 212a, for example, an address indicating a boundary position between the CMYK band memory region 212a and the command region 212b in the large-capacity internal memory 212 can be used.

FIG. 6B illustrates an example of a band termination command of the drawing hardware parameter setting command. The band termination command indicates termination of drawing of the defined band. When the command analyzing unit 2117 receives the band termination command, the command analyzing unit 2117 finishes the drawing processing on the band.

Figure 6C:
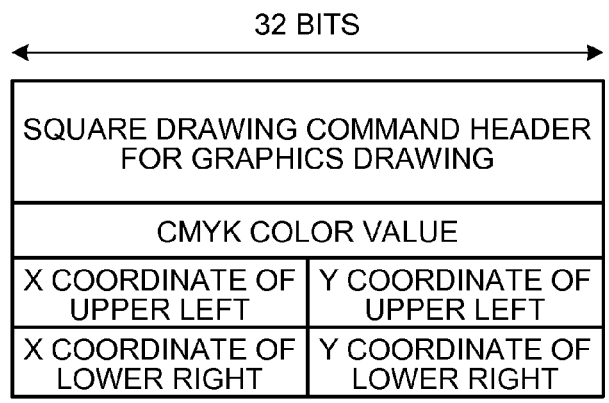

FIG. 6C illustrates an example of the graphics drawing command for drawing graphics in the first embodiment. Described is a graphics drawing command for drawing a square shape (rectangular shape). The graphics drawing command specifies a color value of the square shape to be drawn, X and Y coordinates of the upper left of the square shape, and X and Y coordinates of the lower right of the square shape with respective parameters subsequent to a square drawing command header for graphics drawing.

Figure 6D:
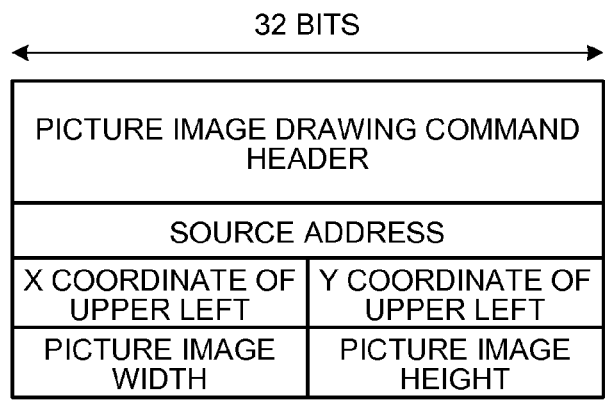

FIG. 6D illustrates an example of the picture image drawing command for drawing a picture image in the first embodiment. The picture image drawing command specifies an source address of a picture image to be drawn, that is, an address of the data memory region 102c in the main memory 102, X and Y coordinates of the upper left at which drawing of the picture image is started, and a width and a height of the picture image with respective parameters subsequent to a picture image drawing command header.

Figure 7:
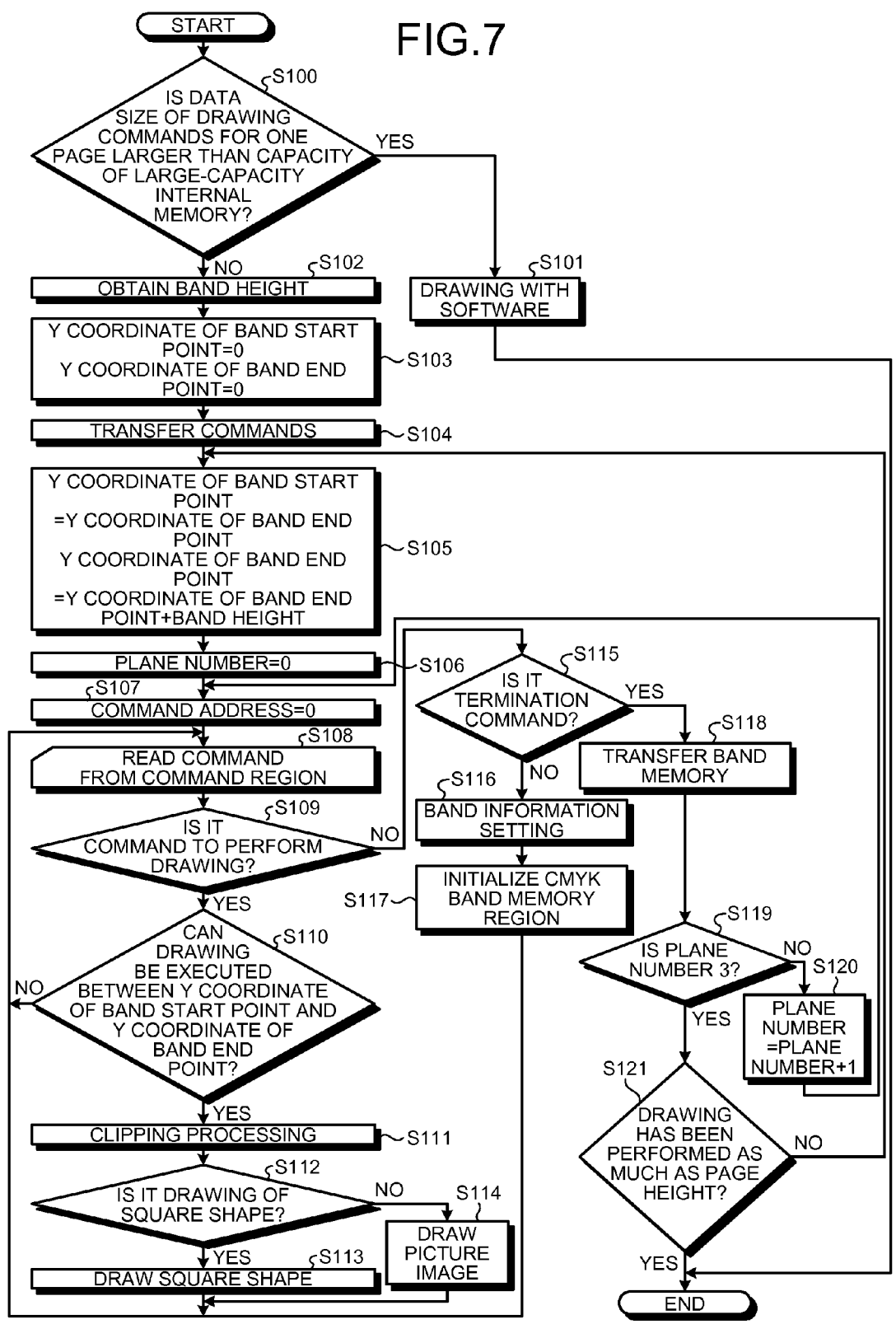
FIG. 7 is a flowchart illustrating an example of a process in the drawing unit in the first embodiment.

FIG. 7 is a flowchart illustrating an example of a process in the drawing unit 211 in the first embodiment. For example, when the CPU 110 instructs the drawing unit 211 to start drawing for one page, the drawing unit 211 acquires a data size of the drawing commands for one page instructed to be drawn that are stored in the command region 102b of the main memory 102 at step S100. Then, the drawing unit 211 determines whether the acquired data size of the drawing commands for one page is larger than a capacity of the large-capacity internal memory 212.

In this case, the drawing unit 211 previously reserves a lower-limit capacity for storing the band image data for the CMYK band memory region 212a in the large-capacity internal memory 212. Based on this, the drawing unit 211 compares the acquired data size of the drawing commands for one page and the capacity of the command region 212b so as to obtain a determination result for the capacity of the large-capacity internal memory 212.

If the drawing unit 211 determines that the data size of the drawing commands for one page is larger than the capacity of the large-capacity internal memory 212 at step S100, the process proceeds to step S101 and the drawing of the one page is executed with software.

For example, the drawing unit 211 notifies the CPU 110 that the data size of the drawing commands for one page is larger than the capacity of the large-capacity internal memory 212 at step S101. The CPU 110 reads the drawing commands from the command region 102b of the main memory 102 and performs drawing in response to the notification. Then, the CPU 110 writes the generated image data into the CMYK page memory region 102d of the main memory 102. Then, a series of process in the flowchart of FIG. 7 is finished.

If the drawing unit 211 determines that the data size of the drawing commands for one page is equal to or smaller than the capacity of the large-capacity internal memory 212 at step S100, the process proceeds to step S102.

The drawing unit 211 determines, as the CMYK band memory region 212a, a region excluding a region of the capacity corresponding to the data size of the drawing commands acquired at step S100 from the total capacity of the large-capacity internal memory 212 at step S102. Then, the drawing unit 211 divides the capacity of the CMYK band memory region 212a by a band width so as to obtain a band height. The drawing unit 211 initializes Y coordinates of start and end points of a band to be drawn to 0 at subsequent step S103.

The drawing unit 211 reads the drawing commands for one page instructed to be drawn from the command region 102b of the main memory 102, transfers them to the large-capacity internal memory 212, and writes them into the CMYK band memory region 212a by the command DMA unit 2110 at subsequent step S104. The drawing unit 211 sets a Y coordinate of a new band start point to the Y coordinate of the band end point and further sets a Y coordinate of a new band end point to a value obtained by adding the band height to the Y coordinate of the band end point at subsequent step S105.

The drawing unit 211 initializes a plane number indicating a plane of each of the colors of CMYK to 0 at subsequent step S106. For example, the plane numbers 0, 1, 2, and 3 correspond to plans of the colors of C, M, Y, and K, respectively.

The drawing unit 211 initializes a command address when reading the drawing command from the command region 212b to 0 at subsequent step 3107. Then, the command analyzing unit 2117 of the drawing unit 211 reads one drawing command from the command region 212b in accordance with the command address at subsequent step S108.

At subsequent step S109, the command analyzing unit 2117 of the drawing unit 211 analyzes the read drawing command and determines whether the drawing command is a command to perform drawing. When the read drawing command is any one of the graphics drawing command and the picture image drawing command as illustrated in FIG. 6C and FIG. 6D, respectively, the command analyzing unit 2117 determines that the drawing command is the command to perform drawing and the process proceeds to step S110.

At step 3110, the command analyzing unit 2117 determines whether the drawing with the drawing command read at step S108 can be executed in a range between the Y coordinates of the band start point and the band end point set at step S105. That is to say, the command analyzing unit 2117 determines whether a part or all of the range that is drawn with the drawing command is contained in the range between the Y coordinates of the band start point and the band end point set at step S105. If the command analyzing unit 2117 determines that the drawing cannot be executed in the range, the process is returned to step S108 and the command analyzing unit 2117 reads a subsequent drawing command from the command region 212b.

If the command analyzing unit 2117 determines that the drawing with the drawing command can be executed in the range between the Y coordinates of the band start point and the band end point set at step S105 at step S110, the process proceeds to step S111. Then, the command analyzing unit 2117 performs clipping processing on the drawing command in the range between the Y coordinates of the band start point and the band end point set at step S105. For example, the command analyzing unit 2117 cuts out a portion relating to the drawing in the range between the Y coordinates of the band start point and the band end point in the drawing command. The command analyzing unit 2117 transmits the drawing command on which the clipping processing has been performed to the drawing processing unit 2112.

The drawing processing unit 2112 determines whether the drawing specified by the drawing command transmitted from the command analyzing unit 2117 is drawing of a square shape at subsequent step S112. For example, when the drawing command is the graphics drawing command, the drawing processing unit 2112 determines that the drawing command is a command to draw the square shape.

If the drawing processing unit 2112 determines that the drawing command transmitted from the command analyzing unit 2117 is the drawing command to draw the square shape at step S112, the process proceeds to step S113. Then, the drawing processing unit 2112 performs drawing of the square shape on the currently specified plane in accordance with the drawing command and writes the generated band image data into the CMYK band memory region 212a. Then, the process is returned to step S108.

If the drawing processing unit 2112 determines that the drawing command transmitted from the command analyzing unit 2117 is not the drawing command to draw the square shape at step S112, the process proceeds to step S114. In this case, the drawing command is the picture image drawing command for drawing a picture image. The drawing processing unit 2112 reads the picture image data in accordance with the source address specified by the drawing command from the data memory region 102c of the main memory 102 at step S114. Then, the drawing processing unit 2112 performs the drawing with the read picture image data on the currently specified plane based on the picture image data, and writes the generated band image data into the CMYK band memory region 212a. Then, the process is returned to step S108.

At step S109 as mentioned above, if the command analyzing unit 2117 determines that the drawing command read at step S108 is not the command to perform drawing, the process proceeds to step 3115. In this case, the read drawing command is any one of the band information setting command as illustrated in FIG. 6A and the termination command as illustrated in FIG. 63. The command analyzing unit 2117 determines whether the read drawing command is the termination command at step S115.

If the command analyzing unit 2117 determines that the read drawing command is not the termination command at step S115, that it to say, determines that the drawing command is the band information setting command, the process proceeds to step S116. The command analyzing unit 2117 sets pieces of band information with the band information setting command at step S116, and initializes the CMYK band memory region 212a in accordance with the pieces of set band information at subsequent step S117. Then, the process is returned to step S108.

If the command analyzing unit 2117 determines that the read drawing command is the termination command at step S115, the process proceeds to step S118. The drawing unit 211 transfers the band image data written into the CMYK band memory region 212a by the band DMA unit 2114 to the CMYK page memory region 102d of the main memory 102 to store it in the CMYK page memory region 102d at step S118.

The process proceeds to subsequent step S119, and the drawing unit 211 determines whether the present plane number is 3. In other words, the drawing unit 211 determines whether the band image data transferred to the CMYK page memory region 102d from the CMYK band memory region 212a at step S118 above correspond to a plane of the color K that is transferred finally among the planes of the respective colors of CMYK.

If the drawing unit 211 determines that the present plane number is not 3 at step S119, the process proceeds to step S120 and a new plane number is set by adding 1 to the plane number. Then, the process is returned to step S107 and the pieces of processing from step S107 are executed for the new plane number.

If the drawing unit 211 determines that the present plane number is 3 at step S119, the process proceeds to step S121. This indicates that the drawing of the planes of the respective colors of CMYK is finished for one band. The drawing unit 211 determines whether drawing has been performed as much as the height of the page at step S121. If the drawing unit 211 determines that the drawing has not been performed as much as the height of the page, the process is returned to step S105. Then, the pieces of processing from step S105 are executed for a subsequent band.

If the drawing unit 211 determines that drawing has been performed as much as the height of the page, it is considered that drawing for one page is completed and a series of process in the flowchart in FIG. 7 is finished.

Comparison with Comparative Techniques

Figure 8:
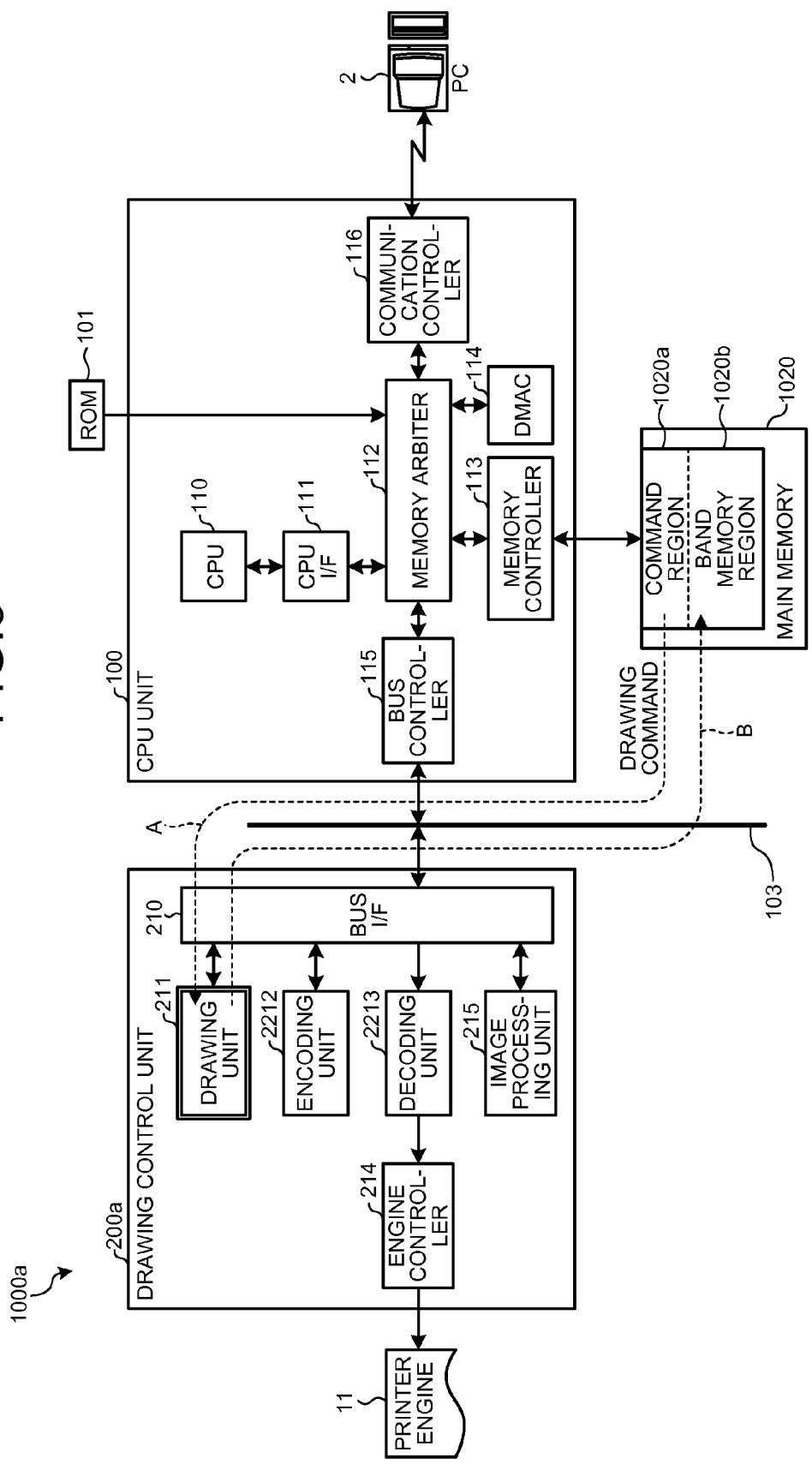
FIG. 8 is a diagram for comparing the configuration in the first embodiment and a configuration in a comparative technique.
Figure 9:
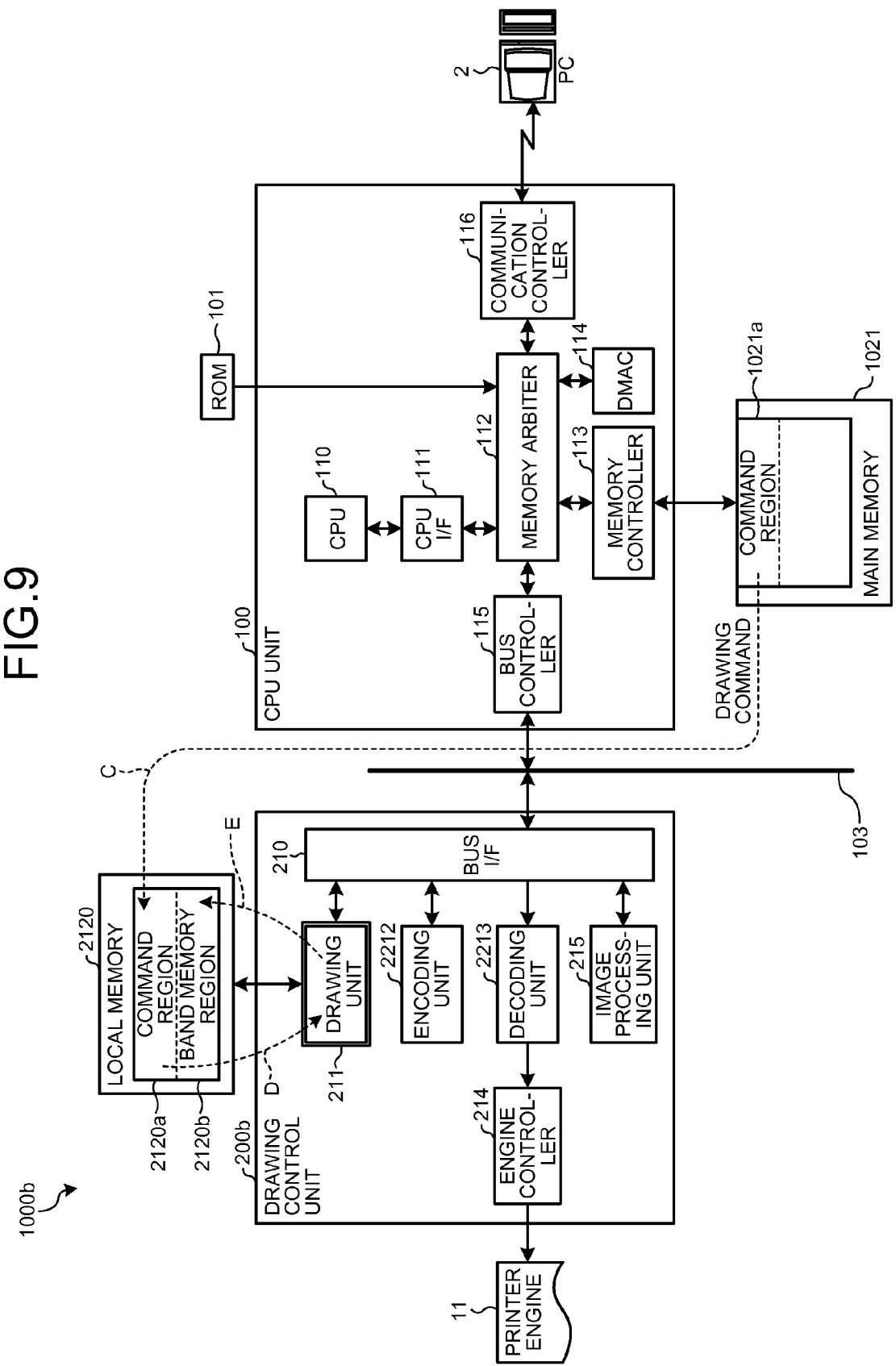
FIG. 9 is a diagram for comparing the configuration in the first embodiment and a configuration in another comparative technique.
Figure 10:
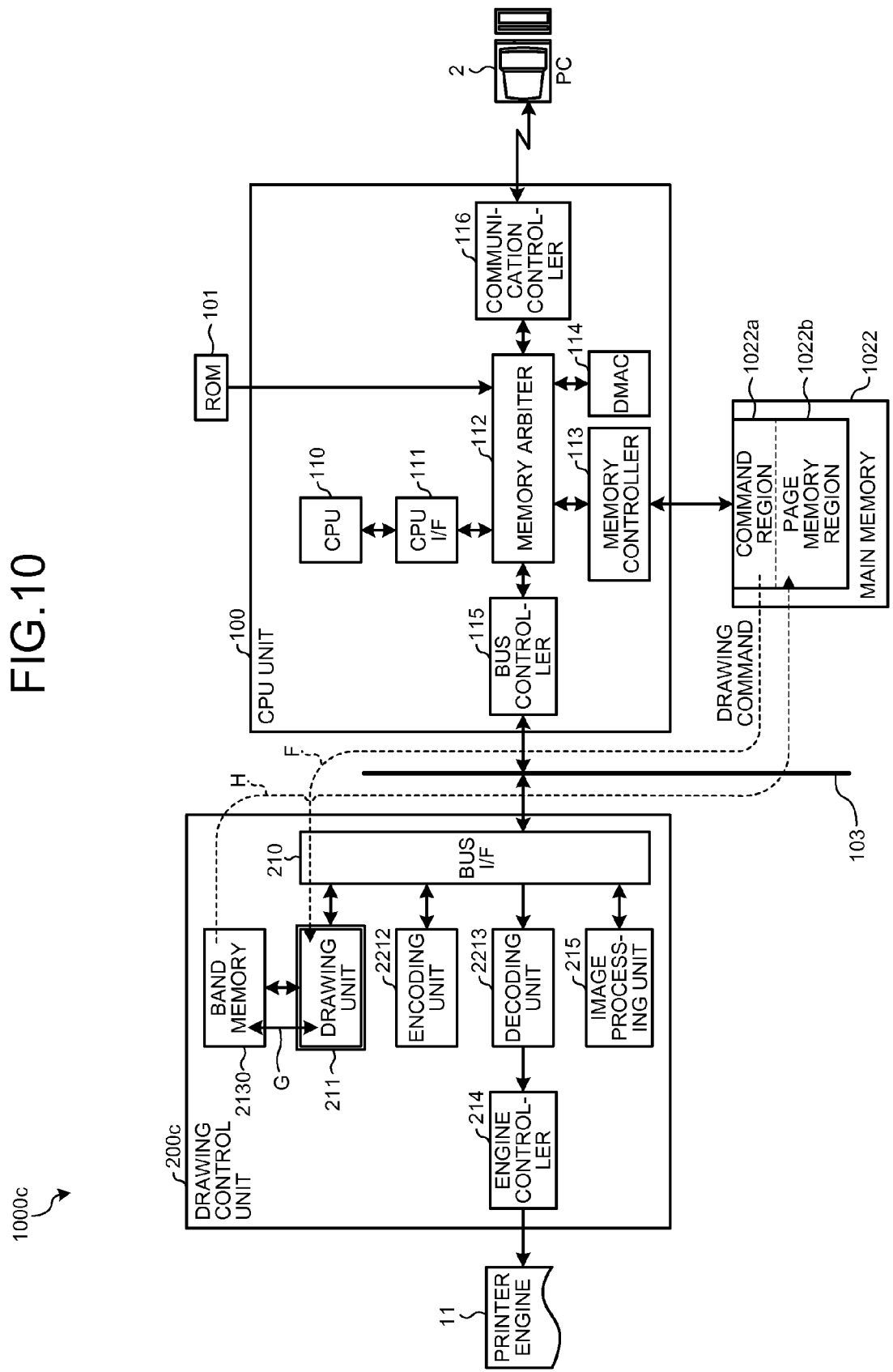
FIG. 10 is a diagram for comparing the configuration in the first embodiment and a configuration in still another comparative technique.

The configuration in the first embodiment and the configurations in the comparative techniques are compared with each other with reference to FIG. 8 to FIG. 10. FIG. 8 to FIG. 10 illustrate examples of the configurations of image forming apparatuses 1000a, 1000b, and 1000c in the comparative techniques, respectively. In FIG. 8 to FIG. 10, the same reference numerals denote the parts common to those in FIG. 1 above and detailed description thereof is omitted.

FIG. 8 illustrates a first example of the image forming apparatus in the comparative technique. FIG. 8 illustrates an example in which a main memory 1020 corresponding to the main memory 102 in FIG. 1 includes a command region 1020a storing therein a drawing command, and a band memory region 1020b storing therein band image data. That is to say, in the example of FIG. 8, the command region 212b and the CMYK band memory region 212a that are included in the large-capacity internal memory 212 incorporated in the drawing control unit 200 in FIG. 1 are provided on the main memory 1020 as the command region 1020a and the band memory region 1020b, respectively.

With the configuration as illustrated in FIG. 8, when the drawing unit 211 performs drawing, the drawing unit 211 reads a drawing command from the command region 1020a of the main memory 1020 through the bus 103 as indicated by a path A in FIG. 8. Furthermore, the drawing unit 211 writes the band image data generated by the drawing into the band memory region 1020b of the main memory 1020 through the bus 103 as indicated by a path B in FIG. 8.

To be more specific, in a drawing control unit 200a, the band image data drawn by the drawing unit 211 is encoded by an encoding unit 2212, so that the data capacity thereof is compressed. Then, the obtained data is transferred to the main memory 1020 through the bus 103 and is written into the band memory region 1020b in the compressed state. Furthermore, the compression encoded band image data that has been read from the band memory region 1020b is supplied to the drawing control unit 200a through the bus 103, and is decoded by a decoding unit 2213. Then, the obtained data is subjected to image processing by the image processing unit 215 and is supplied to the engine controller 214.

Thus, in the example of FIG. 8, the transfer of the drawing command and the band image data through the bus is performed through the bus 103 for each drawing in the band. This arises a risk of lowering in relation to the transfer rate of the bus 103. In order to suppress the lowering in relation to the transfer rate of the bus 103, it is necessary to provide the encoding unit 2212 and the decoding unit 2213 on the drawing control unit 200a, resulting in increase in the cost.

FIG. 9 illustrates a second example of the image forming apparatus in the comparative technique. FIG. 9 illustrates an example in which a local memory 2120 corresponding to the large-capacity internal memory 212 in FIG. 1 is connected to a drawing control unit 200b at the outside thereof. That is to say, the local memory 2120 is connected to the ASIC forming the drawing control unit 200b at the outside thereof through a predetermined wiring.

In the case of the example of FIG. 9, the operations of the drawing unit 211 are the same as the operations in the first embodiment described with reference to FIG. 1 other than a point that the drawing command is read from and the band image data is written into the local memory 2120 at the outside of the drawing control unit 200b formed by the ASIC.

That is to say, in FIG. 9, when the drawing unit 211 performs drawing, the drawing unit 211 reads drawing commands for one page from a command region 1021a of a main memory 1021 through the bus 103 (path C in FIG. 9) and writes them into a command region 2120a of the local memory 2120. The drawing unit 211 reads the drawing command from the command region 2120a (path D in FIG. 9), and performs drawing of a band image. The drawn band image data is written into a band memory region 2120b of the local memory 2120 (path E in FIG. 9).

In the case of the example of FIG. 9, when the drawing unit 211 performs the drawing, the drawing unit 211 reads the drawing commands for one page from the main memory 1021 through the bus 103 and writes them into the command region 2120a of the local memory 2120. Then, the drawing unit 211 reads the drawing command from the local memory 2120 and writes the drawn band image data into the local memory 2120 in the band drawing. This suppresses access through the bus 103 in comparison with the example in FIG. 8.

On the other hand, with the configuration in FIG. 9, the local memory 2120 is provided at the outside of the drawing control unit 200b, that is, the outside of the ASIC. This requires access to the command region 2120a and the band memory region 2120b from the drawing control unit 200b to be performed through the predetermined wiring at the outside of the ASIC. Many restrictions are made to the wiring at the outside of the ASIC in view of layout and a sufficient transfer rate cannot be obtained in the data transfer between the local memory 2120 and the drawing control unit 200b in some cases. In this case, the upper limit of the transfer rate of the band image data depends on the transfer rate of the wiring connecting the local memory 2120 and the drawing control unit 200b. This arises a risk of lowering in relation to the transfer rate of the band image data.

Due to this, the band image data drawn by the drawing unit 211 is transferred to the local memory 2120 after being subjected to compression encoding once for increasing the transfer rate thereof. In this case, in order to suppress the lowering in relation to the transfer rate between the local memory 2120 and the drawing control unit 200b, it is necessary to provide the encoding unit 2212 and the decoding unit 2213 on the drawing control unit 200b, resulting in increase in the cost.

FIG. 10 illustrates a third example of the image forming apparatus in the comparative technique. FIG. 10 illustrates an example in which the CMYK band memory region 212a in the large-capacity internal memory 212 in FIG. 1 is provided as a band memory 2130 in a drawing control unit 200c. With this configuration, the drawing unit 211 and the band memory 2130 are connected to each other directly in the ASIC. With this, the degree of freedom of the wiring connecting the drawing unit 211 and the band memory 2130 is high and a sufficient transfer rate can be achieved.

In the case of the example of FIG. 10, when the drawing unit 211 performs drawing, the drawing unit 211 reads a drawing command from a command region 1022a in a main memory 1022 through the bus 103 (path F in FIG. 10) and performs drawing of a band image. Then, the drawing unit 211 writes the band image data generated by the drawing into the band memory 2130 through a wiring in the ASIC (path G in FIG. 10). Subsequently, the drawing unit 211 transfers the band image data written into the band memory 2130 to a page memory region 1022b of the main memory 1022 through the bus 103 (path H in FIG. 10).

That is to say, in the example of FIG. 10, the drawing unit 211 reads the drawing command through the bus 103 for each drawing for the band image. Furthermore, the band image data written into the band memory 2130 is transferred to the main memory 1022 through the bus 103. In this case, the band image data is encoded by the encoding unit 2212, so that the data capacity thereof is compressed. Then, the obtained data is transferred to the main memory 1022 through the bus 103. Furthermore, the compression encoded band image data that has been read from the main memory 1022 is supplied to the drawing control unit 200c through the bus 103, and is decoded by the decoding unit 2213. Then, the obtained data is subjected to image processing by the image processing unit 215, and is supplied to the engine controller 214.

Thus, in the example of FIG. 10, the transfer of the drawing command and the band image data is performed through the bus 103 for each drawing in the band. This arises a risk of lowering in relation to the transfer rate of the bus 103. In order to suppress the lowering in relation to the transfer rate of the bus 103, it is necessary to provide the encoding unit 2212 and the decoding unit 2213 on the drawing control unit 200c, resulting in increase in the cost.

With the configurations as illustrated in FIG. 8 to FIG. 10, when the image data of one page is drawn, there arises a risk that it is difficult to increase the drawing speed due to the transfer rate of the bus 103 as a bottleneck. In addition, with the configurations as illustrated in FIG. 8 to FIG. 10, it is necessary to provide the encoding unit 2212 and the decoding unit 2213 on the drawing processing unit, resulting in increase in the cost.

In contrast, in the image forming apparatus 1 in the first embodiment as illustrated in FIG. 1, the large-capacity internal memory 212 storing therein the drawing commands for one page and the drawn band image data is provided in the drawing control unit 200, that is, the ASIC. With this, the access to the main memory 102 through the bus 103 that is performed in the drawing of one page can be suppressed. This can suppress a problem that the transfer rate of the bus 103 becomes the bottleneck of the drawing speed. In addition, the configuration as illustrated in FIG. 1 eliminates the necessity of the encoding unit and the decoding unit and is advantageous in terms of the cost.

Second Embodiment

Figure 11:
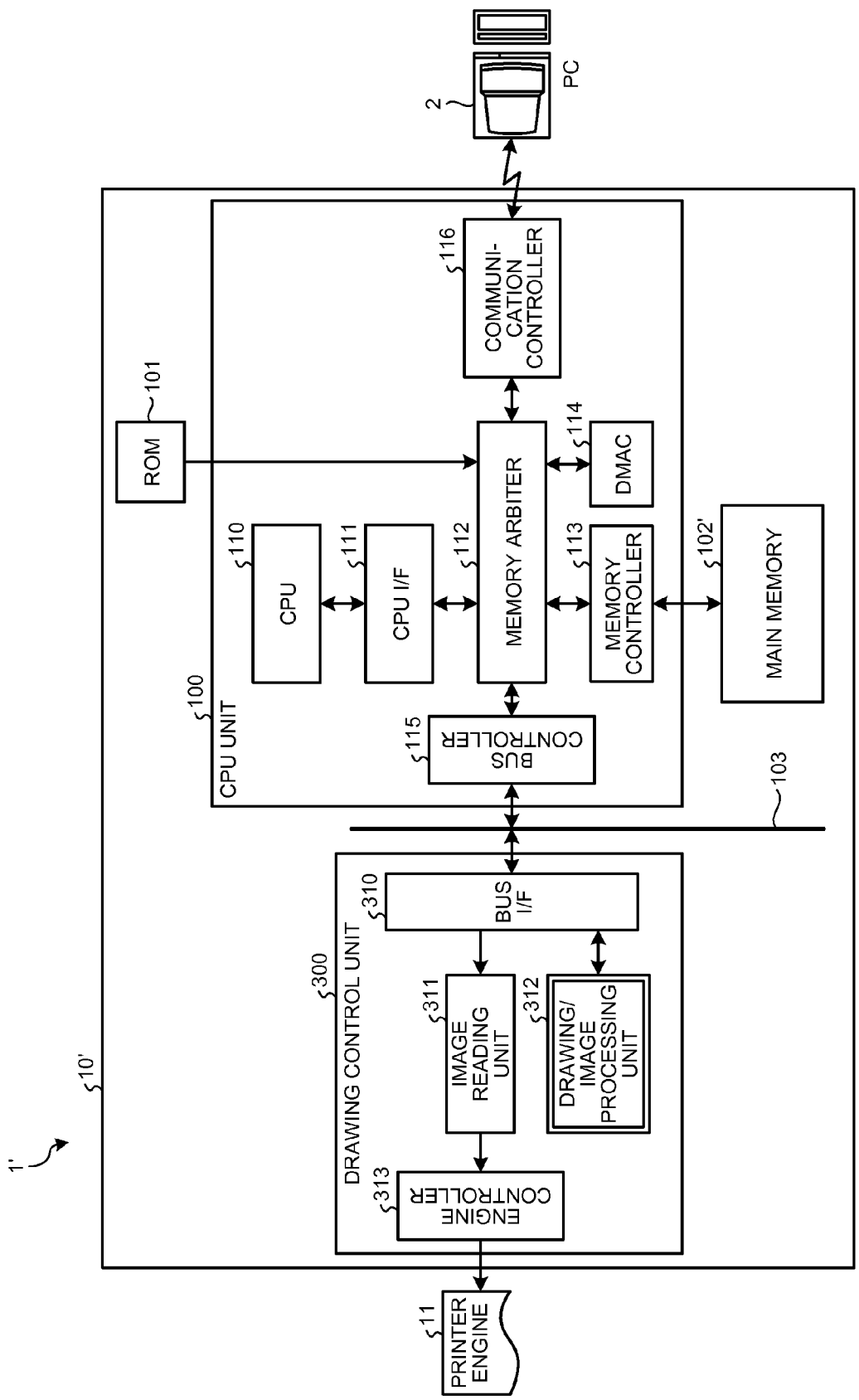
FIG. 11 is a block diagram illustrating an example of the configuration of an image forming apparatus according to a second embodiment.

Next, described is a second embodiment. FIG. 11 is a block diagram illustrating an example of the configuration of an image forming apparatus 1' in the second embodiment. In FIG. 11, the same reference numerals denote the parts common to those in FIG. 1 above and detailed description thereof is omitted.

In FIG. 11, the image forming apparatus 1' includes an image formation control unit 10' and a printer engine 11. The image formation control unit 10' includes a CPU unit 100 and a drawing control unit 300. The CPU unit 100 incorporates a memory controller 113. The drawing control unit 300 includes an engine controller 313 and a drawing/image processing unit 312. The CPU unit 100 and the drawing control unit 300 are connected to each other through a bus 103. Furthermore, a ROM 101 and a main memory 102' are connected to the CPU unit 100. The ROM 101 previously stores therein various types of programs for controlling the image forming apparatus 1'.

The CPU unit 100 has the same functions as the CPU unit 100 in FIG. 1 and includes a CPU 110, a CPU I/F 111, a memory arbiter 112, the memory controller 113, a DMAC 114, a bus controller 115, and a communication controller 116. The respective parts included in the CPU unit 100 are configured integrally in one integrated circuit, for example. The CPU 110 controls operations of the image forming apparatus 1' overall in accordance with the programs stored in the ROM 101.

In FIG. 11, the DMAC 114 controls direct access to the main memory 102' through the memory controller 113 and controls direct access to the drawing control unit 300 through the bus 103 in accordance with an instruction from the CPU 110. The configurations of the CPU unit 100 other than the DMAC 114 in FIG. 11 are the same as the above-mentioned configurations in FIG. 1 and description thereof is omitted herein.

The drawing control unit 300 includes a bus I/F 310, an image reading unit 311, the drawing/image processing unit 312, and the engine controller 313, and is configured integrally in one ASIC. The bus I/F 310 is an interface with the bus 103. The drawing/image processing unit 312 reads a drawing command and an image processing parameter generated by the CPU 110 based on PDL data through the bus 103. The drawing/image processing unit 312 performs drawing processing and image processing on image data generated by the drawing processing in accordance with the read drawing command and image processing parameter. The image data that has been drawn and on which the image processing has been performed is supplied to the main memory 102' through the bus 103, and is written into a specified position of the main memory 102'.

The image reading unit 311 reads the image data on which the image processing has been performed from the main memory 102' for each page, for example, and transfers it to the engine controller 313. The engine controller 313 supplies the transferred image data to the printer engine 11 and controls the printer engine 11 based on the image data. The printer engine 11 forms an image based on the image data on a recording medium such as print paper in accordance with the control by the engine controller 313.

Figure 12:
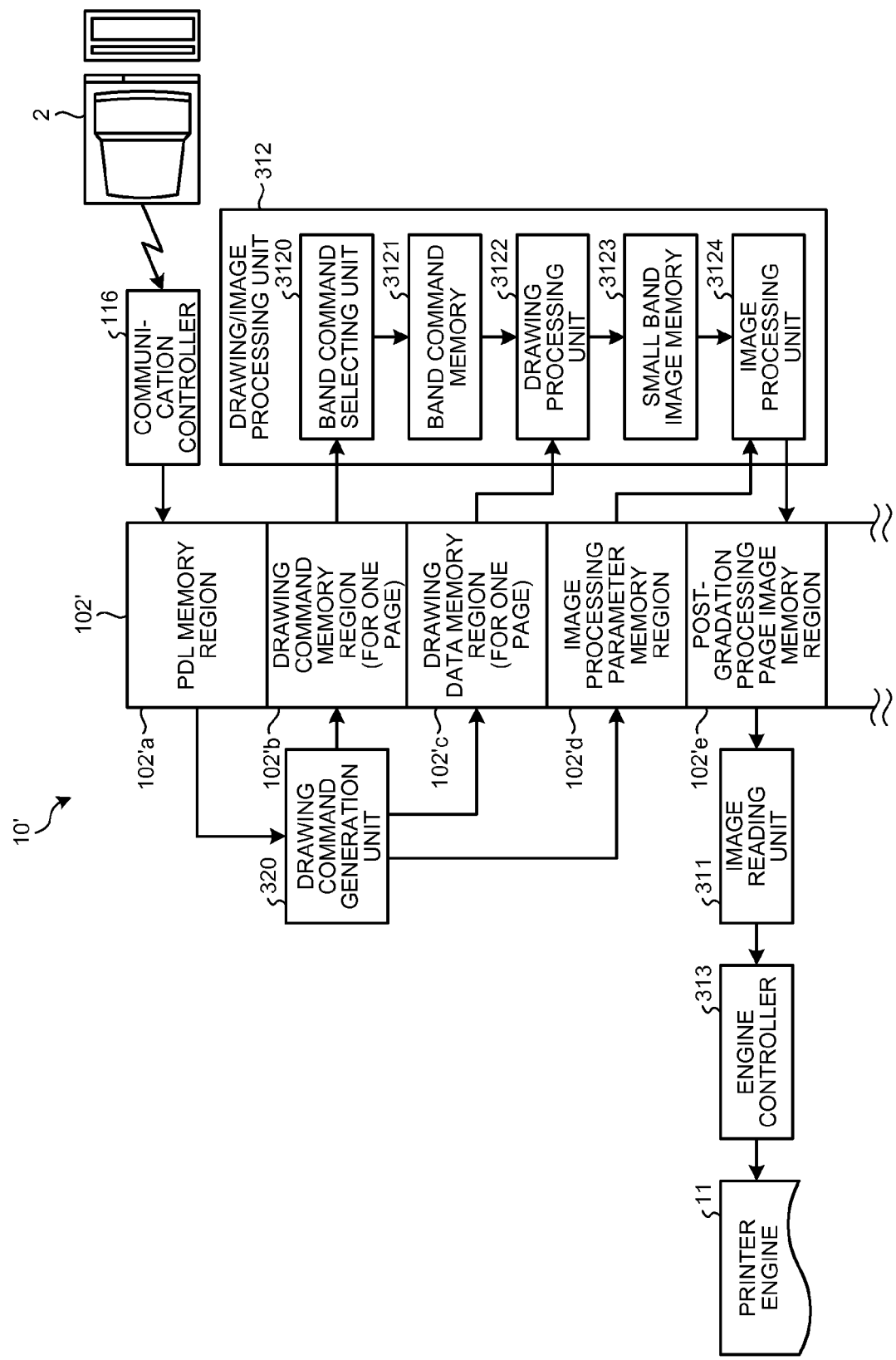
FIG. 12 is a diagram for explaining outline of image processing in the second embodiment.

The outline of the image processing in the second embodiment is described with reference to FIG. 12. FIG. 12 is a functional block diagram for explaining functions of the image forming apparatus 1' in the image processing in the embodiment.

In FIG. 12, the main memory 102' includes a PDL memory region 102'a, a drawing command memory region 102'b, a drawing data memory region 102'c, an image processing parameter memory region 102'd, and a post-gradation processing page image memory region 102'e. The PDL memory region 102'a stores therein the PDL data created by the PC 2 and received by the communication controller 116. The drawing command memory region 102'b stores therein the drawing commands in units of a page, for example, for one page. The drawing data memory region 102'c stores therein the drawing data to be used for the drawing, for example, picture image data formed with bit map data. The image data on which the pieces of processing up to the gradation processing are finished is written into the post-gradation processing page image memory region 102'e in units of a page.

Hereinafter, description is made with reference to FIG. 12. For example, the PC 2 generates the PDL data for forming an image and transmits it to the image forming apparatus 1'. The PDL data is received by the communication controller 116 and is stored in the PDL memory region 102'a of the main memory 102' in the image forming apparatus 1'.

A drawing command generation unit 320 generates drawing commands for drawing (generating) image data for forming the image and picture image data as drawing data that is used for the drawing in units of a page based on the PDL data stored in the PDL memory region 102'a. The drawing command generation unit 320 stores the generated drawing commands for one page, for example, in the drawing command memory region 102'b of the main memory 102'. The drawing command generation unit 320 stores the generated drawing data for one page, for example, in the drawing data memory region 102'c of the main memory 102'. In addition, the drawing command generation unit 320 generates image processing parameters that are used in an image processing unit 3124, which will be described later, based on the PDL data, and stores them in the image processing parameter memory region 102'd of the main memory 102'.

It is to be noted that the drawing command generation unit 320 is configured by a program running on the CPU 110, for example.

The drawing/image processing unit 312 includes a band command selecting unit 3120, a band command memory 3121, a drawing processing unit 3122, a small band image memory 3123, and the image processing unit 3124. The band command selecting unit 3120 selects a band command instructing drawing of a band image on a band command region having a predetermined height (number of lines) from the drawing commands for one page stored in the drawing command memory region 102'b. The selected band command is stored in the band command memory 3121.

The drawing processing unit 3122 draws a band image in accordance with the band command stored in the band command memory 3121 and the drawing data stored in the drawing data memory region 102'C. At this time, the drawing processing unit 3122 generates small band image data that is band image data having a height lower than the band command region. The drawing processing unit 3122 stores the generated small band image data in the small band image memory 3123.

The image processing unit 3124 performs predetermined image processing such as the gradation processing on the small band image data stored in the small band image memory 3123 in accordance with the image processing parameters stored in the image processing parameter memory region 102'd. The image processing unit 3124 stores the small band image data on which the image processing has been performed, in the post-gradation processing page image memory region 102'e of the main memory 102'.

The above-mentioned pieces of processing by the units from the band command selecting unit 3120 to the image processing unit 3124 are repeated until drawing as much as the height in accordance with the band command stored in the band command memory 3121 is finished.

For example, the CPU 110 determines whether the drawing processing for one page is finished. If the CPU 110 determines that the drawing processing is not finished, the CPU 110 performs selecting processing of the band command by the band command selecting unit 3120. If the CPU 110 determines that the drawing processing is finished, the CPU 110 instructs the image reading unit 311 to read page image data for one page that is stored in the post-gradation processing page image memory region 102'e.

The image reading unit 311 reads the page image data from the post-gradation processing page image memory region 102'e in accordance with the instruction and transfers it to the engine controller 313. The engine controller 313 outputs the transferred page image data to the printer engine 11. The printer engine 11 forms an image on a recording medium such as print paper in accordance with the page image data output from the engine controller 313.

Figure 13:
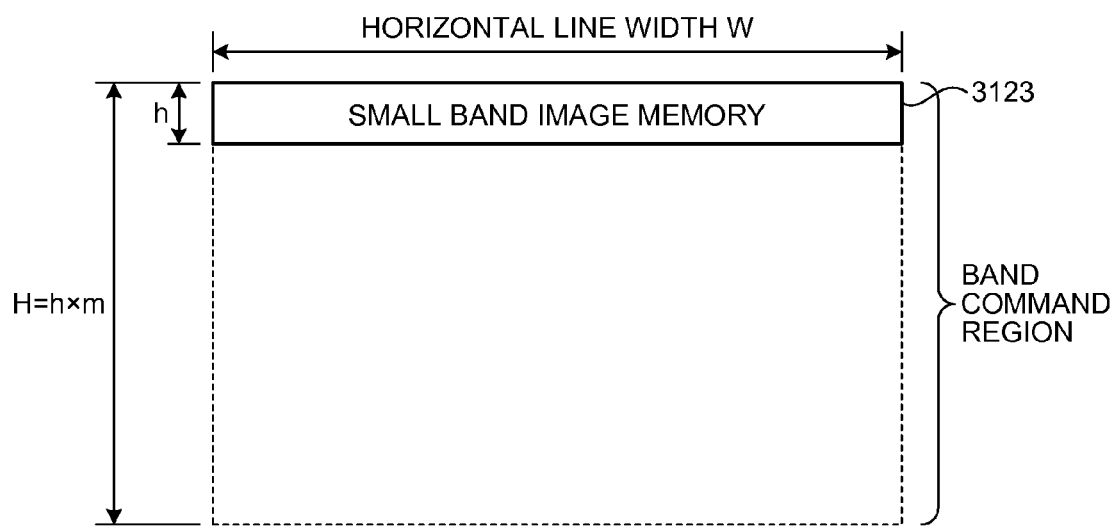
FIG. 13 is a diagram illustrating an example of the configuration of a small band image memory in the second embodiment.

The small band image memory 3123 in the second embodiment is described with reference to FIG. 13 and FIG. 14. FIG. 13 illustrates an example of the configuration of the small band image memory 3123 in the second embodiment. It is assumed that drawing is performed on a region having a height (number of lines) H with the band command. The region on which drawing is performed with the band command is referred to as a band command region. The small band image memory 3123 is a memory storing therein small band image data having a height h corresponding to the number of lines smaller than that of the band command region having the height H.

When the height H=height h×m (m is an integer of equal to or more than 2) is assumed to be satisfied, the band image data that is drawn with one band command is written into the small band image memory 3123 in m divided batches. As an example, the case where the height of the band image data that is drawn with the band command assumed to be 512 lines and the height h of the small band image data is assumed to be 64 lines is considered. In this case, the small band image memory 3123 has a capacity capable of storing the image data for 64 lines and the band image data is written into the small band image memory 3123 as pieces of small band image data each having the height h in eight divided batches.

When image formation of image data having the A4 size at the resolution of 600 dpi is performed, the number of pixels contained in one line is 6760 pixels, for example. When each pixel is formed by an RGBA data having values of the respective colors of RGB and attribute information A of the pixel and each value has a bit depth of 8 bits, the number of bits of each pixel is 32 bits. In this case, a data amount of one line is approximately 27 kilobytes (kB). A capacity of approximately 13.8 megabytes (MB) is required for storing band image data for 512 lines. It is difficult to incorporate a memory having this capacity in the ASIC constituting the drawing control unit 300. On the other hand, it is sufficient that the small band image memory 3123 has a capacity of approximately 1.7 MB for 64 lines and the small band image memory 3123 can be incorporated in the ASIC easily.

Figure 14:
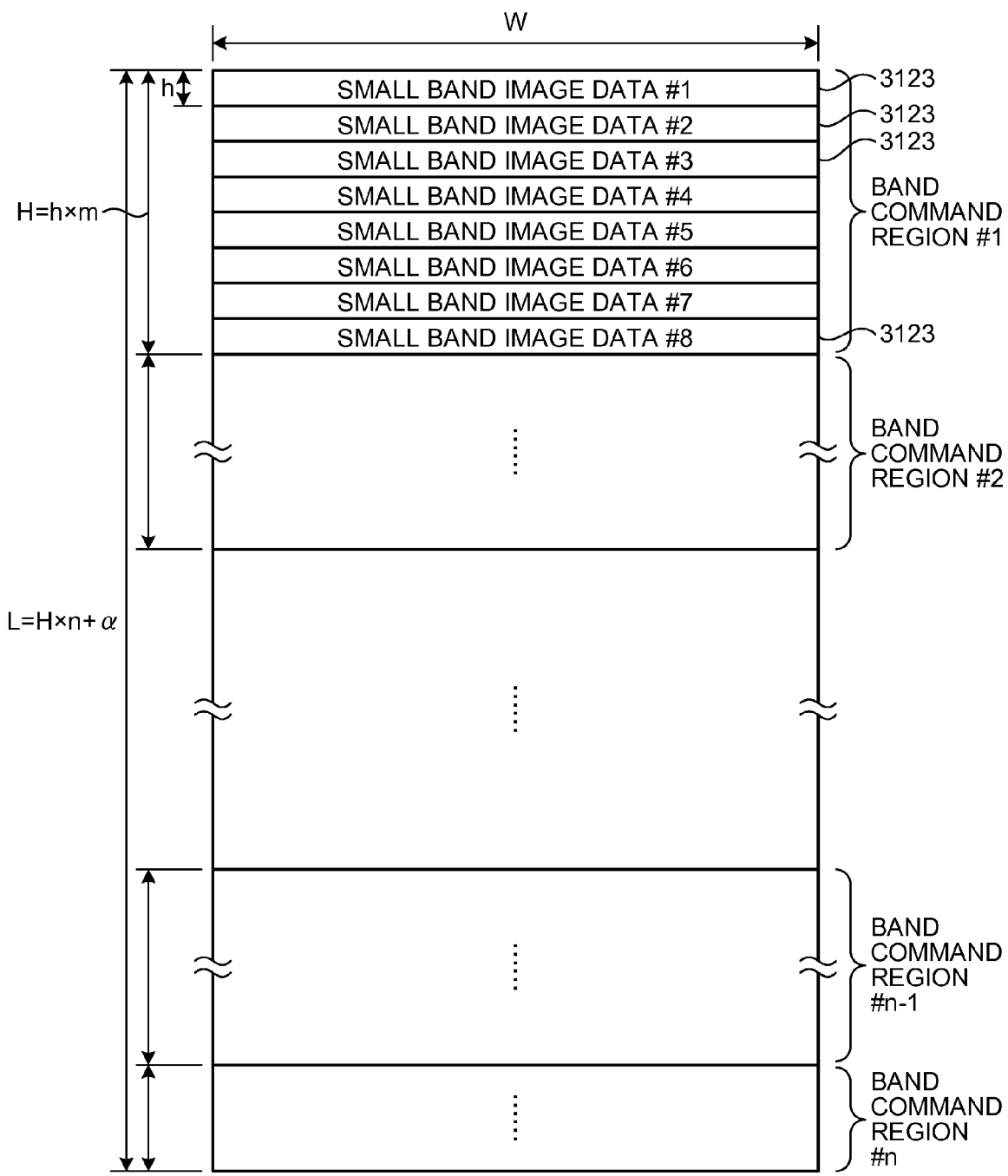
FIG. 14 is a diagram illustrating an example of a relation among a page, band command regions, and pieces of small band image data in the second embodiment.

FIG. 14 illustrates an example of a relation among a page, band command regions, and pieces of small band image data in the second embodiment. In the example of FIG. 14, the resolutions in the horizontal direction and the perpendicular direction (that is to say, page width direction and page height direction) are set to 600 dpi and 400 dpi, respectively. A page height L is set to 4740 lines, and a page width W is set to 6760 pixels. When the height H of the band command region is set to 512 lines, one page is formed by 9 band command regions and a band command region containing 132 lines only. The drawing of one page is performed by drawing with the band command n times while divided into n band command regions of band command regions #1, #2, . . . , and #n.

Hereinafter, the line position in one page is expressed by a Y coordinate, and a point of origin of the Y coordinate is set to a line at the head (upper end of the page in FIG. 14) of the page. A value of the Y coordinate is increased toward the lower of the page line by line. A range of each of the band command regions #1 to #n and a range of image data that is written into the small band image memory 3123 are expressed by the Y coordinates in one page. Furthermore, a position of a pixel in each line is expressed by an X coordinate and a point of origin of the X coordinate is set to a left end. A value of the X coordinate is increased toward the right of the line pixel by pixel.

In the second embodiment, drawing is performed with one band command in units of the small band image memory 3123. When the height h of the small band image data that is drawn in the small band image memory 3123 is 64 lines and the height H of the band command region is 512 lines, the drawing with one band command is performed while divided into eight pieces of small band image data #1 to #8.

Each of the pieces of small band image data #1 to #8 is written into and read from the small band image memory 3123 sequentially. For example, drawing is performed with a band command (that is assumed to be a band command #1) corresponding to a band command region #1 line by line, and respective lines of the small band image data #1 are written into the small band image memory 3123, for example. When writing for a $1^{st}$ line to a $64^{th}$ line is finished, the written small band image data #1 is read out from the small band image memory 3123. Subsequently, drawing for a $65^{th}$ line to a $128^{th}$ line is performed with the band command #1, and pieces of small band image data from the $65^{th}$ line are written into the small band image memory 3123 sequentially. These pieces of processing are repeated until drawing for all the lines with the band command #1 is finished. The above-mentioned pieces of processing are repeated for the respective band commands #2 to #n sequentially.

As described above, in the second embodiment, the drawing command for performing drawing of a page is transferred from the main memory 102' to the band command memory 3121 included in the drawing control unit 300. Then, the drawing of a band image is performed in the drawing control unit 300 in accordance with the drawing command. In this case, for example, the drawing of the band image is performed in the small band image memory 3123 storing therein the small band image data for 64 lines, for example, in a plurality of divided batches. This can reduce the capacity of the band memory in which the band image is drawn, thereby making it possible to provide the band memory in the drawing control unit 300. With this, the drawing of the band image can be executed in the drawing control unit 300 without using the bus 103, thereby making it possible to execute the drawing processing at a higher speed.

Furthermore, in the second embodiment, the drawing commands for drawing small band images are stored in the band command memory 3121. With this, the reading of the drawing command from the main memory 102' through the bus 103 is not required to be performed many times, thereby making it possible to suppress the idling time. This can avoid a problem of lowering in relation to the transfer rate of the bus 103.

Furthermore, in the second embodiment, only the drawing command is stored in the band command memory 3121 provided in the drawing control unit 300 and is stored separately from the drawing data (source image data of a picture image). With this, the band command memory 3121 can be constructed by a memory having small capacity.

In addition, in the second embodiment, after the drawing in the small band image memory 3123 is finished, image processing is performed directly on the small band image data that has been drawn and stored in the small band image memory 3123. Therefore, the drawn small band image data is not required to be transferred to the main memory 102' through the bus 103. This can avoid a problem of lowering in relation to the transfer rate of the bus 103.

In addition, it is not necessary to store the band image data in the main memory 102', reducing the capacity of the main memory.

The embodiment achieves an effect of enabling generation of image data having a large size at a higher speed by a configuration with reduced cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
a first storage unit including a first region and a second region;
a second storage unit including a third region storing therein a drawing command for generating image data for at least one page, and a fourth region capable of storing therein image data for each page;
a drawing command transfer unit configured to transfer the drawing command stored in the third region to the first region to store the drawing command in the first region;
a drawing unit configured to generate band image data in units of a band having a height lower than a height of one page and a width determined previously, in accordance with the drawing command stored in the first region;
a band image data transfer unit configured to transfer the band image data for one band that has been generated by the drawing unit to the second region to store the band image data in the second region; and
an image transfer unit configured to transfer the band image data stored in the second region to the fourth region to store the band image data in the fourth region, wherein
the drawing unit determines the first region in accordance with a size of the drawing command stored in the third region, and determines a region obtained by subtracting the first region from a region of the first storage unit to be the second region.

2. The image processing device according to claim 1, wherein the drawing unit determines a height of the band in accordance with a size of the second region and a width of the band.

3. The image processing device according to claim 1, wherein the drawing command transfer unit transfers the drawing command for drawing an image for one page to the first region to store the drawing command in the first region.

4. The image processing device according to claim 3, wherein the drawing unit does not generate image data with the drawing command when the size of the drawing command that is stored in the third region is larger than a data size capable of being stored in the first storage unit.

5. The image processing device according to claim 1, wherein
when the drawing command is an initializing command, the drawing unit initializes the second region, and
when the drawing command is a command causing band image data to be generated, the drawing unit obtains a height range of the band image data that is caused to be generated by the command in one page, determines whether image data that is generated by the command is included in the height range, skips the command when not included in the height range, and performs clipping with the height range when included in the height range.

6. The image processing device according to claim 1, wherein
the drawing command is a drawing command for generating pieces of image data of a plurality of planes for one page;
the drawing unit generates the image data for the planes for each plane, and
the second region stores therein the image data for one plane.

7. The image processing device according to claim 1, wherein the second storage unit further includes a fifth region capable of storing therein picture image data.

8. The image processing device according to claim 1, further comprising:
a first integrated circuit to which the second storage unit is connected, and
a second integrated circuit that is connected to the first integrated circuit through a bus, wherein
the first integrated circuit includes:
a drawing command generation unit that analyzes a page description language so as to generate the drawing command; and
a memory controller that controls access to the second storage unit, and
the second integrated circuit includes the first storage unit, the drawing command transfer unit, the drawing unit, the band image data transfer unit, and the image transfer unit.

9. An image processing method comprising:
transferring, to a first region included in a first storage unit, a drawing command for generating image data for at least one page stored in a third region that is included in a second storage unit, to store the drawing command in the first region;
analyzing the drawing command stored in the first region so as to acquire a command included in the drawing command, determining the first region in accordance with a size of the drawing command stored in the third region, and determining a region obtained by subtracting the first region from a region of the first storage unit to be a second region;

generating band image data in units of a band having a height lower than a height of one page and a width determined previously, in accordance with the drawing command stored in the first region;

transferring the band image data for one band that has been generated at the generating to the second region and storing the band image data in the second region; and transferring the band image data stored in the second region to a fourth region that is included in the second storage unit and is capable of storing therein image data for each page to store the image data in the fourth region.

10. An image forming apparatus comprising:

an image processing device; and an image forming unit, wherein the image processing device comprising:

a first storage unit including a first region and a second region;

a second storage unit including a third region storing therein a drawing command for generating image data for at least one page, and a fourth region capable of storing therein image data for each page;

a drawing command transfer unit configured to transfer the drawing command stored in the third region to the first region to store the drawing command in the first region;

a drawing unit configured to generate band image data in units of a band having a height lower than a height of one page and a width determined previously, in accordance with the drawing command stored in the first region;

a band image data transfer unit configured to transfer the band image data for one band that has been generated by the drawing unit to the second region to store the band image data in the second region; and an image transfer unit configured to transfer the band image data stored in the second region to the fourth region to store the band image data in the fourth region, the drawing unit determines the first region in accordance with a size of the drawing command stored in the third region, and determines a region obtained by subtracting the first region from a region of the first storage unit to be the second region, and the image forming unit forms an image on a recording medium in accordance with the image data stored in the fourth region.

\* \* \* \* \*